US008214829B2

(12) United States Patent
Neogi et al.

(10) Patent No.: US 8,214,829 B2
(45) Date of Patent: Jul. 3, 2012

(54) TECHNIQUES FOR PLACING APPLICATIONS IN HETEROGENEOUS VIRTUALIZED SYSTEMS WHILE MINIMIZING POWER AND MIGRATION COST

(75) Inventors: Anindya Neogi, New Delhi (IN); Akshat Verma, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 841 days.

(21) Appl. No.: 12/354,072

(22) Filed: Jan. 15, 2009

(65) Prior Publication Data

US 2010/0180275 A1 Jul. 15, 2010

(51) Int. Cl.
G06F 9/455 (2006.01)
(52) U.S. Cl. ................... 718/1; 713/300; 713/320
(58) Field of Classification Search ............ 713/300, 713/320; 718/1
See application file for complete search history.

(56) References Cited

U.S. PATENT DOCUMENTS

| 7,447,920 | B2 * | 11/2008 | Sharma et al. ............... 713/300 |
| 7,861,102 | B1 * | 12/2010 | Ranganathan et al. ....... 713/300 |
| 8,099,615 | B2 * | 1/2012 | Tripathi ........................ 713/324 |
| 2006/0168230 | A1 * | 7/2006 | Caccavale et al. ............. 709/226 |
| 2007/0300085 | A1 * | 12/2007 | Goodrum et al. .............. 713/300 |
| 2008/0104605 | A1 | 5/2008 | Steinder et al. |
| 2008/0209043 | A1 * | 8/2008 | Ajiro .............................. 709/226 |
| 2008/0271038 | A1 * | 10/2008 | Rolia et al. ...................... 718/105 |
| 2008/0295096 | A1 * | 11/2008 | Beaty et al. ........................ 718/1 |
| 2009/0259345 | A1 * | 10/2009 | Kato et al. ....................... 700/295 |
| 2010/0050171 | A1 * | 2/2010 | Liang et al. ........................ 718/1 |
| 2010/0228861 | A1 * | 9/2010 | Arsovski et al. ................ 709/226 |
| 2010/0306776 | A1 * | 12/2010 | Greene ............................. 718/101 |
| 2011/0113273 | A1 * | 5/2011 | Okitsu et al. .................... 713/320 |

OTHER PUBLICATIONS

Rajamani et al., Application-Aware Power Management, in IISWC, pp. 39-48, 2006.
Control power and cooling for data center efficiency, HP Thermal Logic technology, An HP BladeSystem innovation primer.
Kephart et al., Coordinating multiple autonomic managers to achieve specified power-performance tradeoffs, Fourth International Conference of Autonomic Computing (ICAC'07).

(Continued)

Primary Examiner — Idriss N Alrobaye
(74) Attorney, Agent, or Firm — Ryan, Mason & Lewis, LLP

(57) ABSTRACT

N applications are placed on M virtualized servers having power management capability. A time horizon is divided into a plurality of time windows, and, for each given one of the windows, a placement of the N applications is computed, taking into account power cost, migration cost, and performance benefit. The migration cost refers to cost to migrate from a first virtualized server to a second virtualized server for the given one of the windows. The N applications are placed onto the M virtualized servers, for each of the plurality of time windows, in accordance with the placement computed in the computing step for each of the windows. In an alternative aspect, power cost and performance benefit, but not migration cost, are taken into account; there are a plurality of virtual machines; and the computing step includes, for each of the windows, determining a target utilization for each of the servers based on a power model for each given one of the servers; picking a given one of the servers with a least power increase per unit increase in capacity, until capacity has been allocated to fit all the virtual machines; and employing a first fit decreasing bin packing technique to compute placement of the applications on the virtualized servers.

4 Claims, 15 Drawing Sheets

OTHER PUBLICATIONS

Bobroff et al., Dynamic Placement of Virtual Machines for Managing SLA Violations, In Integrated Network Management, pp. 119-128. IEEE, 2007.

Horvath et al., Dynamic Voltage Scaling in Multitier Web Servers with End-to-End Delay Control, IEEE Trans. Comput., 56(4), 2007.

Lefurgy et al., Energy Management for Commercial Servers, IEEE Computer, 36(12):39-48, 2003.

Rusu et al., Energy-Efficient Real-Time Heterogeneous Server Clusters, Proceedings of the Twelfth IEEE Real-Time and Embedded Technology and Applications Symposium (RTAS'06).

Ranganathan et al., Ensemble-level Power Management for Dense Blade Servers, Proceedings of the 33rd International Symposium on Computer Architecture (ISCA'06).

Petitet et al., HPL—A Portable Implementation of the High-Performance Linpack Benchmark for Distributed-Memory Computers, Sep. 10, 2008, http://www.netlib.org/benchmark/hpl/.

IBM Active Energy Manager, http://www-03.ibm.com/systems/management/director/about/director52/extensions/antengmrg.html.

IBM developerWorks: Enterprise Workload Manager for Multiplatforms overview, http://www.ibm.com/developervvorks/autonomic/ewlm/.

Rajamani et al., On Evaluating Request-Distribution Schemes for Saving Energy in Server Clusters, 2003 IEEE.

Bianchini et al., Power and Energy Management for Server Systems, Published by IEEE Computer Society, 2004, pp. 68-76.

VMware vSphere, Distributed Resource Scheduling, Distributed Power Management of Server Resources, http://www.vmware.com/products/vi/vc/drs/html.

Chase et al., Balance of Power: Energy Management for Server Clusters, In HotOS, 2002.

Chen et al., Managing Server Energy and Operational Costs in Hosting Centers, Sigmetrics'05, Proceedings of the 2005 ACM Sigmetrics International.

Elnozahy et al., Energy Conservation Policies for Web Servers, In Proc. of USITS, 2003.

Felter et al., A Performance-Conserving Approach for Reducing Peak Power Consumption in Server Systems, in ICS, 2005.

Urgaonkar et al., An Analytical Model for Multi-tier Internet Services and its Applications, in Sigmetrics, 2005.

Zhang et al., A Comparative Analysis of Space- and Time-Sharing Techniques for Parallel Job Scheduling in Large Scale Parallel Systems, pp. 1-33.

Steinder et al., Server Virtualization in Autonomic Management of Heterogeneous Workloads, pp. 1-10.

Chase et al., Managing Energy and Server Resources in Hosting Centers, In Proc. ACM SOSP, 2001.

Heath et al., Energy Conservation in Heterogeneous Server Clusters, In Proc. of ACM PPoPP, 2005.

Nathuji et al., VirtualPower: Coordinated Power Management in Virtualized Enterprise Systems, In ACM SOSP, 2007.

Stoess et al., Energy Management for Hypervisor-Based Virtual Machines, In Proc. Usenix Annual Technical Conference, 2007.

M. Yue, A simple proof of the inequality ffd(1) =< (11/9)opt(I)+1, for all 1, for the ffd bin-packing algorithm, Acta Mathematicae Applicatae Sinica, 1991. Abstract.

\* cited by examiner

| BACKGROUND LOAD (CPU) | MIGRATION DURATION | TIME (WITHOUT MIG) | TIME (WITH MIG) |
|---|---|---|---|
| 0 | 60 | 210s | 259s |
| 12 | 70 | 214s | 255s |
| 30 | 63 | 209s | 261s |

```
algorithm mPP
Input : ∀iVMᵢ, Alloc_old  Output = Alloc_new
  ∀Serverⱼ
      Allocⱼ = φ, Usedⱼ = 0
  Sort VMs by size in decreasing order
  for i = 1 to N
      ∀Serverⱼ compute Slope(Usedⱼ)
      Pick the Server_min with the least Slope
      Add VMᵢ to Alloc_min, Used_min + = Size(VMᵢ)
  End For
  Alloc_new = FFD(Used)
  returnAlloc_new
end mPP
```

FIG. 8

```
algorithm iFFD
Input : Alloc_0, Used  Output = Alloc_n
  Donors = φ, Receivers = φ
  For all servers S_j
    Prev_j = sum of VMs in S_j by Alloc_0
    If(Prev_j > Used_j)
      Add S_j to Donors
      Mig_j = Prev_j - Used_j
    Else
      Add S_j to Receivers
  End - For
  For all S_j in Donors
    Pick the smallest VMs that add upto
    Mig_j and add them to MigList
  End - For
  Sort MigList based on size
  For all VM_i in MigList
    Place VM_i on the first Donor_j that
    can pack it within Used_j
  End - For
  Return Alloc_n
```

FIG. 9

```
algorithm pMaP
Input : Alloc_0, VM_i  Output : Migs
  Alloc_n = mPPH(Alloc_0, VM_i)
  MList = getMigList(Alloc_0, Alloc_n)
  ∀Server_j with no VMs placed in Alloc_n
    VG_j = VMs placed on Server_j in Alloc_0
    Add VG_j to MList
  ∀mig_i ∈ MList
    Cost_i = getMigrationCost(mig_i),
    Benefit_i = getBenefit(mig_i)
  Sort MList by Benefit_i/cost_i (decreasing)
  mig_best = most profitable entry in MList
  while(profit_best > cost_best) AND (MList≠φ)
    Migs = Migs ∪ mig_best
    Delete mig_best from MList
    Recompute Cost and Benefit for MList
  End While
  return Migs
end pMaP Alogrithm
```

TECHNIQUES FOR PLACING APPLICATIONS IN HETEROGENEOUS VIRTUALIZED SYSTEMS WHILE MINIMIZING POWER AND MIGRATION COST

FIELD OF THE INVENTION

The present invention relates to the electrical, electronic and computer arts, and, more particularly, to workload placement on servers and the like.

BACKGROUND OF THE INVENTION

Resource provisioning or placement of applications on a set of physical servers to optimize the application Service Level Agreements (SLA) is a well studied problem. Typically, concerns about application performance, infrequent but inevitable workload peaks, and security requirements persuade the provisioning decision logic to opt for a conservative approach, such as hardware isolation among applications with minimum sharing of resources. This leads to sub-optimal resource utilization. Real webserver workloads from sports, e-commerce, financial, and internet proxy clusters have been studied to find that average server utilization varies between 11% and 50%, as known from P. Bohrer et al., "The case for power management in web servers," Power Aware Computing, 2002. Such inefficient provisioning leads to relatively large hardware and operations costs when compared to the actual workload handled by the data center.

SUMMARY OF THE INVENTION

Principles of the invention provide techniques for placing applications in heterogeneous virtualized systems while minimizing power and migration cost. In one aspect, an exemplary method (which can be computer-implemented) for placing N applications on M virtualized servers, the servers having power management capability, includes the steps of dividing a time horizon into a plurality of time windows, and, for each given one of the windows, computing a placement of the N applications, taking into account power cost, migration cost, and performance benefit. The migration cost refers to cost to migrate from a first virtualized server to a second virtualized server for the given one of the windows. Also included is placing the N applications onto the M virtualized servers, for each of the plurality of time windows, in accordance with the placement computed in the computing step for each of the windows.

In an alternative aspect, a variant of the method includes dividing a time horizon into a plurality of time windows, and, for each given one of the windows, computing a placement of the N applications, taking into account power cost and performance benefit. An additional step in the variant includes placing the N applications onto the M virtualized servers, for each of the plurality of time windows, in accordance with the placement computed in the computing step for each of the windows. There are a plurality of virtual machines, and the computing step includes, for each of the windows, determining a target utilization for each of the servers based on a power model for each given one of the servers; picking a given one of the servers with a least power increase per unit increase in capacity, until capacity has been allocated to fit all the virtual machines; and employing a first fit decreasing bin packing technique to compute placement of the applications on the virtualized servers.

One or more embodiments of the invention or elements thereof can be implemented in the form of a computer product including a tangible computer usable storage medium with computer usable program code for performing the method steps indicated. Furthermore, one or more embodiments of the invention or elements thereof can be implemented in the form of an apparatus including a memory and at least one processor that is coupled to the memory and operative to perform exemplary method steps. Yet further, in another aspect, one or more embodiments of the invention or elements thereof can be implemented in the form of means for carrying out one or more of the method steps described herein; the means can include hardware module(s), software module(s), or a combination of hardware and software modules.

One or more embodiments of the invention may offer one or more of the following technical benefits:

1) Minimize the power drawn by the server farm while meeting performance guarantees;
2) Minimize the cost of migrating virtual machines.

These and other features, aspects and advantages of the present invention will become apparent from the following detailed description of illustrative embodiments thereof, which is to be read in connection with the accompanying drawings.

BRIEF DESCRIPTION OF THE DRAWINGS

FIG. 8 presents an exemplary history aware packing technique, according to still another aspect of the invention;

FIG. 9 presents an exemplary migration cost-aware locally optimal placement technique, according to yet another aspect of the invention;

DETAILED DESCRIPTION OF PREFERRED EMBODIMENT

Figure 1:
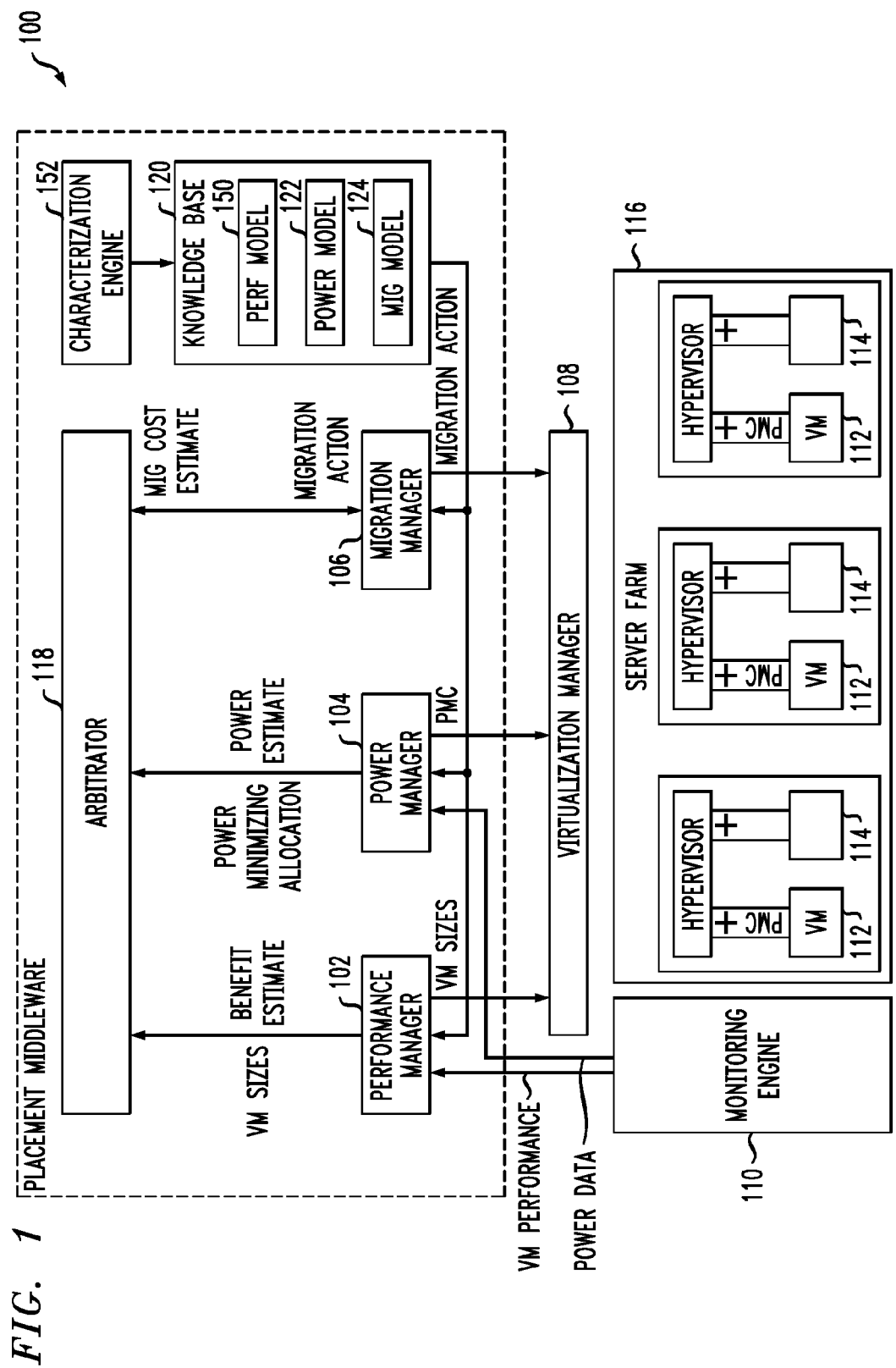
FIG. 1 shows exemplary application placement architecture, according to an aspect of the invention.

Workload placement on servers has been traditionally driven by mainly performance objectives. Aspects of the invention address design, implementation, and evaluation of a power-aware application placement controller in the context of an environment with heterogeneous virtualized server clusters. The placement component of the application management middleware takes into account the power and migration costs in addition to the performance benefit while placing the application containers on the physical servers. One or more embodiments provide multiple ways to capture the cost-aware application placement problem that may be applied to various settings. For each exemplary formulation, details are provided on the kind of information required to solve the problems, the model assumptions, and the practicality of the assumptions on real servers. In another aspect, so-called pMapper architecture and placement techniques are provided to solve one practical formulation of the problem: minimizing power subject to a fixed performance requirement. Comprehensive theoretical and experimental evidence set forth herein demonstrates the efficacy of one or more exemplary embodiments.

Recently, two trends, viz. server virtualization and the heightened awareness around energy management technologies, have renewed interest in the problem of application placement. The placement logic in the middleware now needs to look beyond just application service level agreements (SLAs) into increasing energy-related operations costs. The Power-aware Application Placement problem is discussed herein and a non-limiting exemplary embodiment of pMapper, an application placement controller that dynamically places applications to minimize power while meeting performance guarantees, is set forth.

System management costs have escalated rapidly with the growing number of densely packed under-utilized machines in the data center. Virtualization is seen as a solution that can provide the required isolation layer to consolidate applications running on a large number of low utilization servers to a smaller number of highly utilized servers. The virtualization layer typically provides flexible runtime mechanisms for fine grain resource allocation. In fact, high speed live migration of virtual machines is also possible between the physical servers in a cluster. This enables applications in virtual machine containers to be moved at runtime in response to changing workload to dynamically optimize the application placement on physical servers. Thus, mechanisms to allow dynamic resizing and migration of virtual machine containers among physical servers enables research in dynamic application placement middleware beyond static provisioning.

A second trend that is of significance for dynamic application placement is the growing awareness about energy consumption in data centers and the significant adverse impact on the environment in terms of $CO_2$ emissions from the cooling systems. The current power density of data centers is typically around 100 Watts per square foot (100 Watts per 0.092903 square meters) and growing at the rate of 15-20% per year. Thus, it is increasingly being realized that inefficient use of servers in a data center leads to high energy costs, expensive cooling hardware, floor space, and also adverse impact on the environment. There is a large initiative in the industry as well as academia to develop technologies that will help to create "green" or environment-friendly data centers that will optimize energy consumption and consolidate hardware resources, besides being sensitive to application performance and availability SLAs. To this extent, a dynamic application placement controller can use virtualization to resize virtual machine (VM) containers of applications or migrate VMs at runtime to consolidate the workload on an optimal set of physical servers. Servers unused over a period of time can be switched to low power states to save energy. Further, a fairly large dynamic power range may be encountered in at least some instances (for example, the static power of an IBM HS-21 blade server was 140 Watts and the dynamic potentially non-linear power range was almost 80 Watts for a daxpy benchmark). Hence, even in scenarios where servers can not be switched off by consolidation, power savings can be obtained by packing the servers at optimal target utilization.

The use of power management techniques during application placement has its own implications. A dynamic application placement controller uses live migration and the cost of live migration is significant, and should be factored by the dynamic placement controller. For example, a 512 MB VM running high-performance computing (HPC) benchmarks require almost a minute to migrate and causes a 20-25% drop in application throughput during the live migration. A large number of live migrations are required for dynamic placement, thus emphasizing the importance of taking migration cost into account.

Aspects of the invention provide architecture and implementation of a power-aware application placement framework, called pMapper, which can incorporate various scenarios involving power and performance management using virtualization mechanisms. pMapper provides the solution to the most practical possibility, i.e. power minimization under performance constraints. A non-limiting exemplary implementation of the framework, some techniques, and the interfaces is carried out with an existing commercial IBM performance-oriented workload manager. Benchmarked applications on virtualized server platforms create utilization-based power models of application and server combinations and quantify the virtualization related costs. The characterization study provides insights into the structure of the power-aware placement problem that can be used to design tractable application placement solutions. The power models, migration cost models, and power-aware placement techniques can be used to design a dynamic placement controller that, under various assumptions, performs better than a static or load balancing placement controller with increasing heterogeneity of the server platforms, that is, their power models. All input models and assumptions in pMapper have been validated on a testbed using a set of benchmark applications. The various techniques implemented in pMapper have been compared through simulation on real utilization trace data obtained from a large production environment.

pMapper: Power and Migration Cost-Aware Application Placement Framework

Consider an example of the pMapper application placement framework for power management and the various optimization formulations for power-aware application placement, including a pMapper architecture framework that leverages power management techniques enabled by virtualization.

Architecture

FIG. 1 shows an exemplary architecture 100. One or more embodiments of the pMapper framework utilize all the power management capabilities available in virtualized platforms. Power management actions can be categorized as (i) soft actions like CPU idling in the hypervisor, (ii) hard actions like dynamic voltage and frequency scaling (DVFS) or throttling and (iii) consolidation actions. Commercial hypervisors drop all the power management actions that are taken by the operating system (OS). Further, for multi-tiered applications, a single VM instance may not be able to determine the application end-to-end quality of service (QoS), thus necessitating the need for a power management channel from the management middleware. In pMapper, all the power management actions are communicated by three different managers, with an arbitrator ensuring consistency between the three actions. The soft-actions like VM re-sizing and idling are communicated by the Performance Manager 102, which has a global view of the application in terms of QoS met and performance SLA. Power Manager 104 triggers power management at a hardware layer whereas a Migration Manager 106 interfaces with the Virtualization Manager 108 to trigger consolidation through VM live migration.

The resource management flow of pMapper starts with the Monitoring engine 110, which collects the current performance and power characteristics of all the VMs 112 and physical servers 114 in the farm 116. Performance Manager 102 looks at the current performance and recommends a set of target VM sizes based on the SLA goals. In case the target VM sizes are different from the current VM sizes, it also presents an estimate of the benefit due to resizing. Similarly, Power Manager 104 looks at the current power consumption and may suggest throttling (by DVFS or explicit central processing unit (CPU) throttling). The central intelligence of pMapper lies in Arbitrator 118, which explores the configuration space for eligible VM sizes and placements and implements a technique to compute the best placement and VM sizes, based on the estimates received from Performance, Power and Migration managers 102, 104, 106.

Performance Manager supports interfaces using which the Arbitrator can query for the estimated benefit of a given VM sizing and placement (for all the VMs). In order to cater for heterogeneous platforms, the Performance Manager 102 consults a Knowledge Base 120 to determine the performance of an application, if one of its VM is migrated from one platform to another. The knowledge base 120 stores this information in a performance model 150, which in turn is built by a characterization engine 152, by correlating resource usage of an application and its performance. Similarly, Power Manager 104 supports interfaces using which Arbitrator 118 can get the best power-minimizing placement for a given set of VM sizes. Also, Power Manager 104 uses a power model 122 in the Knowledge Base 120 to determine the placement, as well as estimate the power for a given placement. Migration Manager 106 estimates the cost of moving from a given placement to a new placement and uses the Migration Model 124 for making the estimate. Once the Arbitrator 118 decides on a new configuration, Performance Manager, Power Manager, and Migration Manager 102, 104, 106 execute the VM sizing, server throttling and live migration operations, respectively.

Note that for standalone applications running on power-aware virtualized platforms, such as are set forth in R. Nathuji and K. Schwan, Virtual power: coordinated power management in virtualized enterprise systems, In ACM SOSP, 2007, one or more embodiments of framework can make use of the OS hints by passing them on to the Arbitrator. Hence, one or more embodiments of framework and techniques (discussed hereinbelow) can also be used in other power management frameworks; for example, as set forth in Nathuji and Schwan or in Jan Stoess, Christian Lang, and Frank Bellosa, Energy management for hypervisor-based virtual machines, In Proc. Usenix Annual Technical Conference, 2007.

Optimization Formulations

Embodiments of the invention address the problem of placing N applications on M virtualized servers that have power management capabilities. The power-aware application placement problem divides the time horizon in time windows. In each window, compute the application placement that optimizes the performance-cost tradeoff, i.e., maximizes performance and minimizes cost. The cost metric may include management cost, power cost or the application cost incurred due to the migrations that are required to move to the desired placement. Consider various formulations of the application placement problem.

Cost Performance Tradeoff: The generic formulation of the problem solves two sub-problems: (i) application sizing and (ii) application placement. Given a predicted workload for each application, resize the virtual machine hosting the application and place the virtual machines on physical hosts in a manner such that the cost-performance tradeoff is optimized. For illustrative purposes, focus on the power and migration costs only. Formally, given an old allocation $A_o$, a performance benefit function $B(A)$, a power cost function $P(A)$, and a migration cost function $Mig$ for any allocation $A$, it is desired to find an allocation $A_I$ defined by the variables $x_{i,j}$, where $x_{i,j}$ denotes the resource allocated to application $V_i$ on server $S_j$, such that the net benefit (defined as the difference between performance benefit and costs) is maximized.

$$\text{maximize} \sum_{i=1}^{N} \sum_{j=1}^{M} B(x_{i,j}) - \sum_{j=1}^{M} P(A_I) - Mig(A_o, A_I) \quad (1)$$

Cost Minimization with Performance Constraint: Data centers today are moving towards an SLA-based environment with fixed performance guarantees (for example, response time of 100 ms with throughput of 100 transactions per second). Hence, in such a scenario, performance is not a metric to be maximized and can be replaced by constraints in the optimization framework. In practice, it amounts to taking away the VM sizing problem away from the Arbitrator 118. The VM sizes are now fixed by the Performance Manager 102 based on the SLA and the Arbitrator 118 only strives to minimize the overall cost of the allocation. Hence, the optimization problem can now be formulated as:

$$\text{minimize} \sum_{j=1}^{M} P(A_I) + Mig(A_o, A_I) \quad (2)$$

Performance Benefit Maximization with Power Constraints: A third formulation for the application allocation problem is to maximize the net performance benefit given a fixed power budget for each server, where the net benefit is computed as the difference between the performance benefit and migration cost.

$$\text{maximize} \sum_{i=1}^{N} \sum_{j=1}^{M} B(x_{i,j}) - Mig(A_o, A_I) \quad (3)$$

Consider non-limiting exemplary model assumptions that may be made by pMapper to solve the application placement problem.

Model Assumptions and Exemplary Experiments

Consider exemplary underlying model assumptions and aspects of constructing estimation models required by the three formulations of the application placement problem.

A testbed to experimentally validate the model assumptions included two different experimental setups. The first setup was an IBM HS-21 Bladecenter with multiple blades. Each blade has 2 Xeon5148 dual-core Processors and ran two compute-intensive applications from an HPC suite, namely daxpy and fma and a Linpack benchmark HPL (refer to HPL-A Portable Implementation of the High Performance Linpack Benchmark for Distributed Memory Computers, http://www.netlib.org/benchmark/hpl/) on VMWare ESX Hypervisor. Each blade server has an L2 cache of 4 MB, FSB of 1.33 GHz, with each processor running at 2.33 GHz. The second setup included 9 IBM x3650 rack servers running VMWare ESX with L2 cache of 4 MB. Each server had a quad-core Xeon5160 processor running at 2.99 GHz. This setup ran the Trade6 application as well as the two HPC applications daxpy and fma. The overall system power was measured through IBM Active Energy Manager APIs (IBM Active Energy Manager, http://www-03.ibm.com/systems/management/director/extensions/actengmrg.html). Consider now exemplary model assumptions and illustrative experimental findings on the veracity of the assumptions.

Performance Isolation in Virtualized Systems

Figure 2:
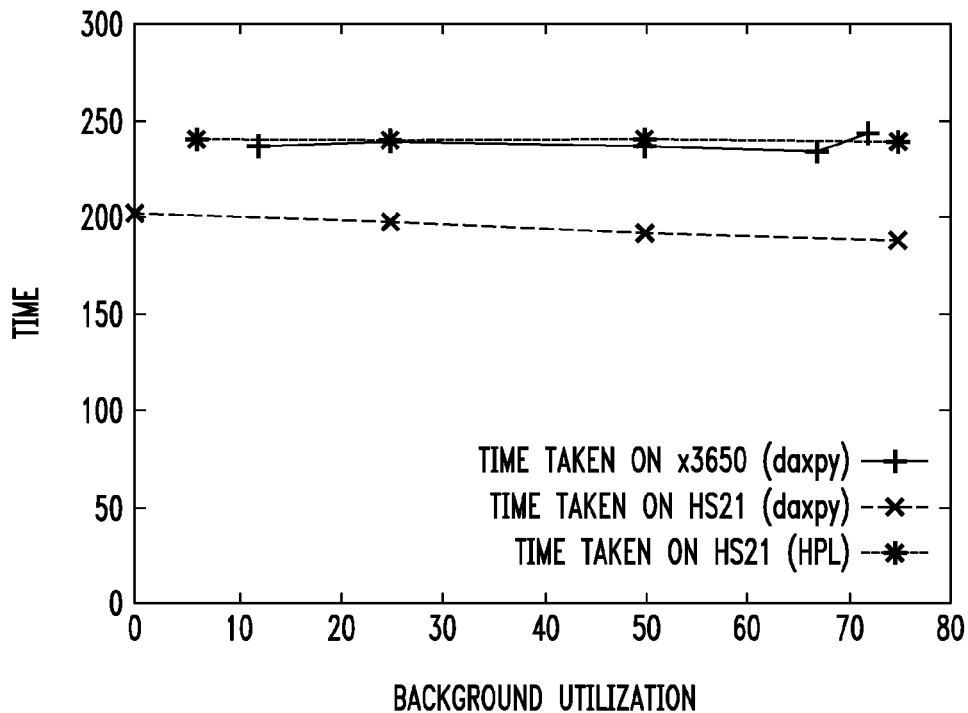
FIGS. 2 and 3 show, respectively, exemplary data for running time of 30 billion daxpy operations with change in background load on HS-21 and x3650 systems at low memory footprint (FIG. 2) and high memory footprint (FIG. 3)

Virtualization allows applications to share the same physical server by creating multiple virtual machines in a manner such that each application can assume ownership of the virtual machine. However, such sharing is possible only if one virtual machine is isolated from other virtual machines hosted on the same physical server. Hence, this underlying assumption was studied by running a background load using fma and a foreground load using daxpy. The applications ran on two different VMs with fixed reservations. The intensity of the background load was varied and the performance (throughput) of the foreground daxpy application was measured, as seen in FIG. 2.

Figure 3:
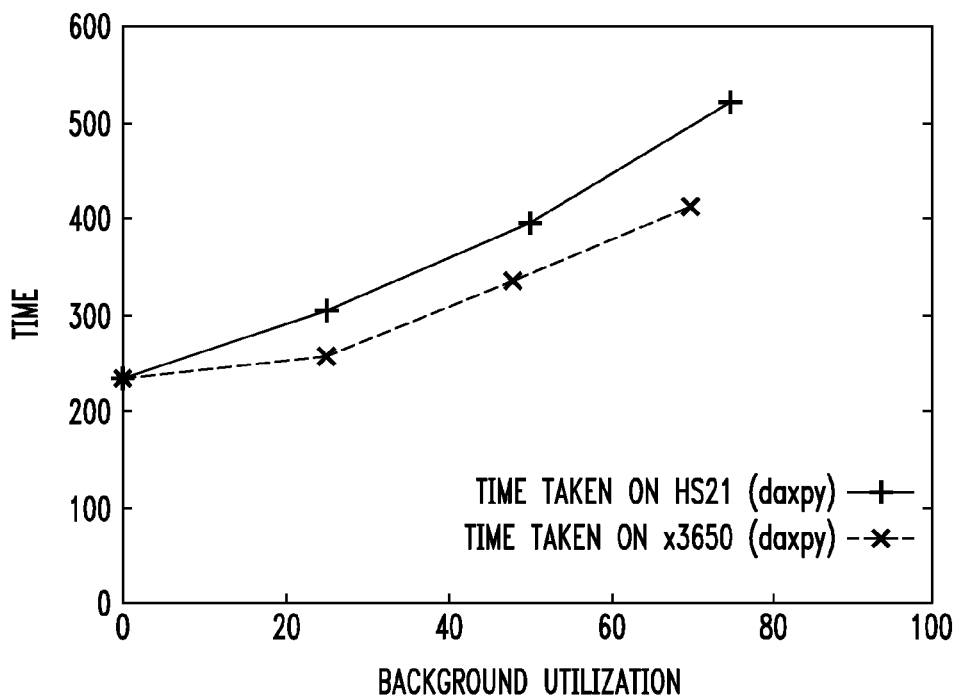

Observe that the daxpy application is isolated from the load variation in the background application. However, consider that applications may only be isolated in terms of CPU and memory, while still competing for the shared cache. Accordingly, the memory footprint of both the foreground daxpy and background fma was increased. It was observed that as the size of the arrays being operated exceeded the L2 cache size (4 MB), the applications were no longer isolated, as seen in FIG. 3. The throughput of the foreground application decreases with increase in background traffic as a result of the large number of cache misses, which are due to increased cache usage by the background application. However, as one increases the memory footprint of each application beyond the cache size, the applications are no longer able to use the cache even in isolation. Hence, for a large range of application use (small and large working set sizes), virtualization is able to successfully isolate two VMs from each other.

Migration Cost Modeling

The application placement problem can be treated as a continual optimization problem, where the live virtual machines are dynamically migrated from one physical server to another in order to optimize the allocation. The migration of virtual machines requires creation of a checkpoint on secondary storage and retrieval of the VM image on the target server. Applications can continue to run during the course of migration. However, the performance of applications is impacted in the transition because of cache misses (hardware caches are not migrated) and possible application quiesces. "Application quiesces" indicate pausing components of a multi-component application, while other components of the application are being migrated. Thus, each migration has a migration duration and a migration cost. The Migration Manager 106 in pMapper needs to estimate this migration cost for use by the Arbitrator 118. Hence, consider the feasibility of characterizing migration cost for an application and study the parameters that affect this cost.

Figures 4, 5:
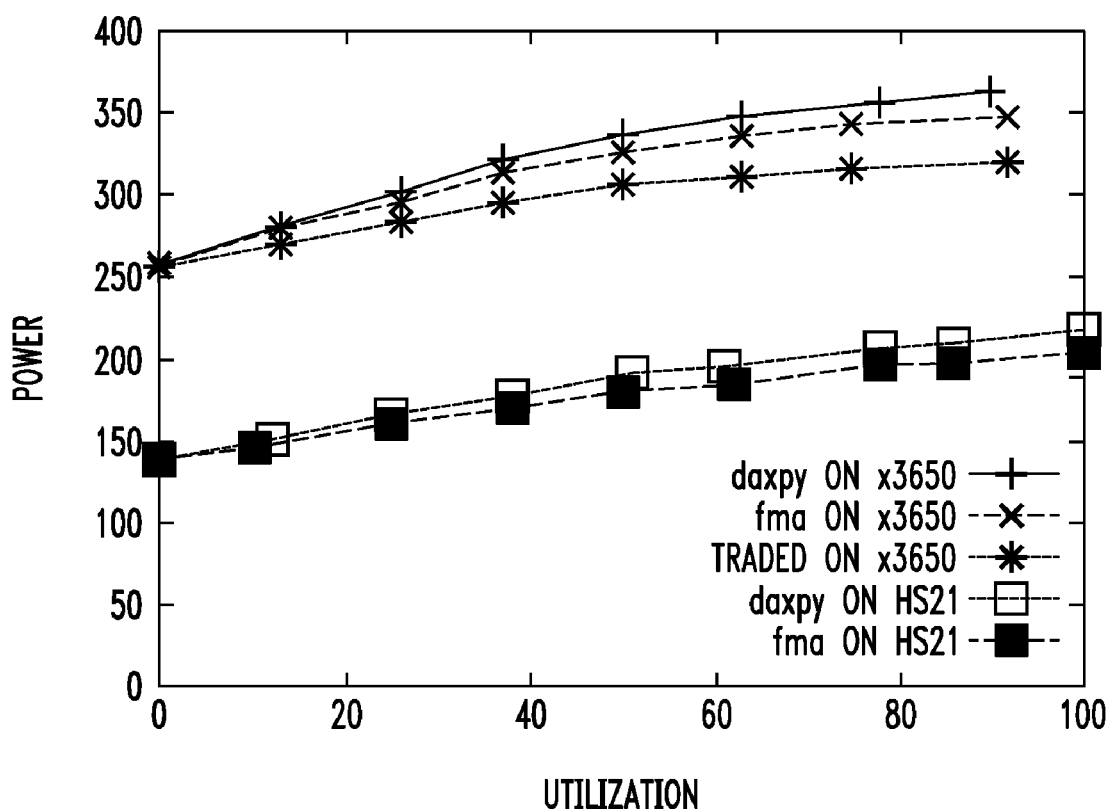
FIG. 4 presents a table with exemplary data regarding Impact of Migration on application throughput with different background traffic.
FIG. 5 presents exemplary data for power drawn by various applications with change in server utilization.

As seen in the table of FIG. 4, the impact of migration was independent of the background load and depends only on the VM characteristics. Hence, the cost of each live migration can be computed a priori. This cost is estimated by quantifying the decrease in throughput because of live migration and estimating the revenue loss because of the decreased performance (as given by SLA). Hence, conclude that it is possible to estimate the cost of live migration of each application for use by pMapper.

Power Modeling

The power-aware application placement controller explores various candidate placements and needs to estimate the overall power drawn for each candidate placement while selecting a good placement. This estimation is especially required to solve the power-constraints and power-performance tradeoff formulations. Consider the feasibility of modeling the power for a server given a mix of applications running on it.

Give a set of N applications and M servers, a large variety of applications can potentially be mixed on each server. Further, any optimization technique may seek to change the ratio of various applications on a server. Hence, in one or more instances, creating a model for all mixes of all applications on all the servers is practically infeasible. Thus, it may be feasible to estimate the power drawn by a server only if it is independent of the applications running on it. Experiments were conducted to validate this assumption by creating power models for various applications on the two testbeds.

As seen in FIG. 5, the power drawn by a server varies with the applications running on it. Hence, a technique that requires an exact power model for each allocation may be infeasible in practice. Further, since migration takes a significant amount of time, any measurement-based strategy that tries to learn the power models for all used application mixes may be infeasible in a dynamic consolidation setting.

The power-capping and power-performance tradeoff frameworks, though interesting in theory, may not be feasible in practice as they require computing the exact power consumed by an application. However, note that a technique to solve the power minimization problem does not need actual power numbers. The problem that the power minimization framework solves is to minimize power, without really knowing what the exact power would be. Hence, a technique that can be listed out as a sequence of steps, where each step is a decision problem for some application to determine which of the candidate servers the application should be placed on, does not need estimates of power values. Instead, if the technique can figure out which server minimizes the incremental increase in total power due to the new application being placed, then it can place the application appropriately.

Note that this approach restricts the technique choices to only those techniques that take a local view of the problem, and hence can be locally optimal in the best case. Further, it is still necessary, in one or more embodiments, to solve the ordering problem, where for any given placement of N−1 applications on M servers, it should be possible to estimate the best server (in terms of power minimization) to place the Nth application. Consider two properties such that even if any one of them holds, one can make this decision.

Definition 1—Ordering Property: For any two applications $VM_i$ and $VM_i$ and servers $S_j$ and $S_{j'}$ at loads $\rho_j$ and $\rho_{j'}$ respectively, if the server $S_j$ is more power efficient than $S_{j'}$ for $VM_i$, then $S_j$ is more power-efficient than $S_{j'}$ for all $VM_i$, as well. Hence, the slopes for any two servers satisfy a uniform ordering across all applications.

Definition 2—Background Independence Property: An application and a server are said to satisfy that Background Independence Property if the incremental power drawn due to the application on the server depends only on the background load intensity and is independent of the traffic mix in the background.

Figures 6, 7:
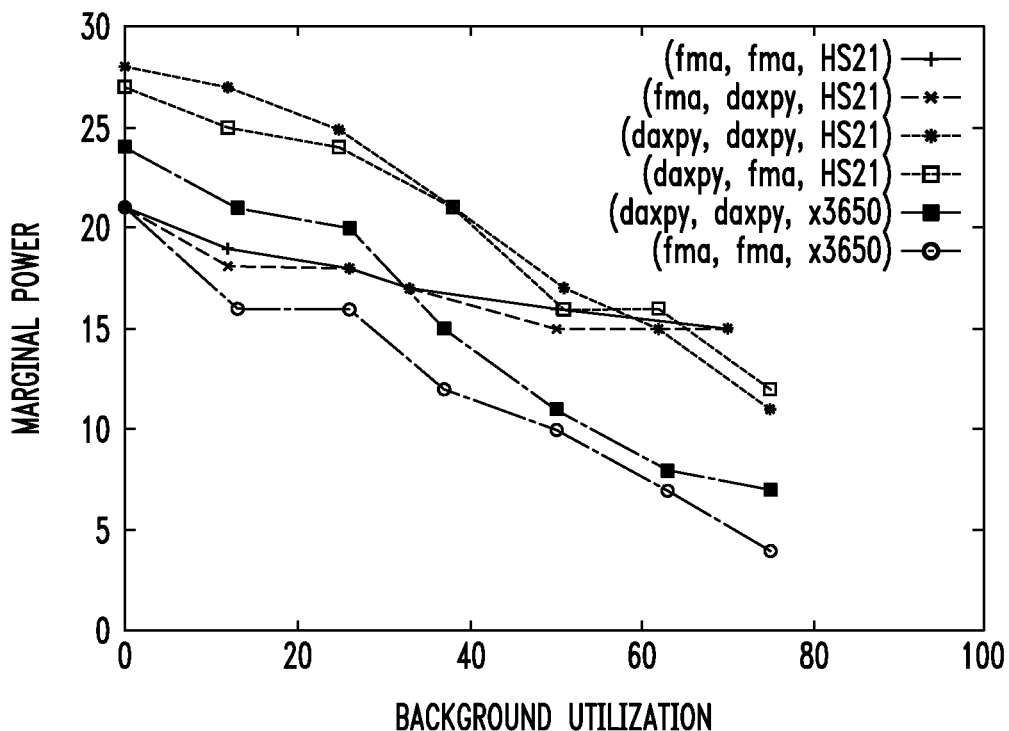
FIG. 6 presents exemplary data for marginal power consumed by HPC applications on various platforms with change in background load and background mix.
FIG. 7 presents an exemplary power-minimizing placement technique, according to another aspect of the invention.

Consider whether these properties can be made to hold in certain situations where there is knowledge about the class of applications to be placed. For example, if only HPC applications or only J2EE applications in a cluster are considered, it can be demonstrated that these properties hold. Two applications were run on the two testbeds for various mixes of background traffic picked from the HPC benchmarks. It was observed that the Ordering Property held for the two applications on the two testbeds. As seen in FIG. 6, that the x3650 platform is more power efficient (incrementally) for both the applications. This is true even when the background traffic was changed from daxpy to fma on the HS21 Blades. Observe that the incremental power drawn by daxpy for both the background traffic at any given background load value is almost the same. Hence, it can be assumed that the Background Independence Property holds at a coarse granularity in most scenarios. Aspects of the invention provide techniques that use these properties to solve the power-minimization optimization problem. Note, in FIG. 6, (A, B, C) denotes incremental power drawn by A with background traffic of B on platform C.

Application Placement Techniques

Consider the various placement techniques designed for minimizing the overall cost, while meeting a fixed performance SLA. The techniques assume that a performance manager provides them with a VM size for each application, which can meet its performance goals. Start with a brief description of the key ideas behind the techniques.

Technique Idea

Embodiments of the invention provide application placement techniques that minimize the power and migration costs, and are based on three key observations:

1. Estimating the power cost of a given configuration may not be possible because power drawn by a server depends on the exact application mix on a server.
2. Background Independence Property and Ordering Property allows picking a server for an application that will minimize the incremental power due to the new application. Hence, local searches are feasible.
3. The above properties may not hold always if servers are equally loaded. However, the properties will definitely hold if an idle server is compared with a loaded server.

The first two observations dictate the design of techniques to be based on local searches. View the application placement problem as a bin-packing problem with differently sized bins. The servers represent the bins and the virtual machines represent the balls. The power drawn by a server is represented as the cost of the bin and the power-minimizing allocation is a packing that minimizes the cost of the packed bins. Since power drawn by a server depends on the actual mix of applications, the cost of packing a bin varies depending on the balls being packed in the bin. Bin packing has many local search techniques like First-Fit Decreasing (FFD) (see M. Yue, A simple proof of the inequality ffd(l)$\leq$(11/9)opt(l)+1, for all l, for the ffd bin-packing algorithm, Acta Mathematicae Applicatae Sinica, 1991), Best-Fit and Worst-fit.

In FFD, balls are ordered by size (largest first). The balls are then packed in the first bin that can accommodate them. If servers are ordered based on power efficiency (static power per unit capacity), then the FFD technique can employ the Ordering property to minimize power. This is because FFD unbalances load, and as per the third observation, the Ordering property always holds if an idle server is being compared with a loaded server. Further, by placing servers based on their power efficiency, ensure that more power efficient servers are the ones that are utilized first. Finally, FFD has good theoretical bounds and is also known to perform well in practice. Hence, focus on adapting First Fit to work for different sized bins with ball-dependent cost functions.

Technique Details

FIG. 7 presents a technique min Power Parity (mPP) to place the VMs on the given set of servers in a manner such that the overall power consumed by all the servers is minimized. The technique takes as input the VM sizes for the current time window that can meet the performance constraints, a previous placement and the power model for all the available servers. It then tries to place the VMs on the servers in a manner that minimizes the total power consumed.

The mPP technique works in two phases: In the first phase, determine a target utilization for each server based on the power model for the server. The target utilization is computed in a greedy manner; start with a utilization of 0 for each server. Then pick the server with the least power increase per unit increase in capacity. Continue the process till capacity has been allocated to fit all the VMs. Since it may not be possible to estimate the server with the least slope for all possible background traffic mixes, pick an arbitrary traffic mix to model the power for each application and use this model in the selection process. Modeling based on an arbitrary background traffic mix also leads to a good solution, as will be discussed further hereinbelow. In the second phase, call the bin-packing technique FFD based on First Fit Decreasing to place the VMs on the servers, while trying to meet the target utilization on each server. The bins in the exemplary embodiment have unequal capacity, where the capacity and order of each bin is defined in the first phase whereas standard FFD that works with randomly ordered equal-sized bins.

Theorem 1: If the Ordering Property or the Background Independence Property hold for a given set of servers and applications, then the allocation values obtained by mPP in its first phase are locally optimal.

Proof: Let there be any two servers $S_j$ and $S_k$ such that some load can be shifted between the two. For simplicity, assume that the load shift requires moving the VM $VM_{i'}$ from $S_j$ (at load $\rho_j$) to $S_k$ (at load $\rho_k$). Also, since $S_j$ was selected over $S_k$ for the additional load, there exists some VM $VM_{i'}$ for which the slope of $S_j$ at load $\rho_j$ is less than the slope for the server $S_k$ at load $\rho_k$. However, by the Ordering assumption, such a VM $VM_{i'}$ cannot exist. This leads to a contradiction and proves the required result.

The proof for the Background Independence Property is straightforward. If this property holds, then the incremental load due to application $VM_i$ is independent of the workload mix, and as a result, the exact increase in power on all candidate servers can always be computed for $VM_i$ and the best server can be picked. Hence, the shares allocated to the servers are locally optimal. This completes the proof.

Observe that if all the power models are concave, then the utilization allocation obtained is globally optimal as well. However, this property was not observed to hold in the experiments and it was concluded that mPP can provably lead to locally optimal allocations only.

The mPP technique is designed to minimize power. However, it is oblivious of the last configuration and hence may entail large-scale migrations. This may lead to a high overall (power+migration) cost. Hence, consider a variant of FFD called incremental FFD (iFFD) for packing the applications on physical servers, given a fixed target utilization for each server in FIG. 8.

iFFD first computes the list of servers that require higher utilization in the new allocation, and labels them as receivers. For each donor (servers with a target utilization lower than the current utilization), it selects the smallest sized applications to migrate and adds them to a VM migration list. It then runs FFD with the spare capacity (target capacity-current capacity) on the receivers as the bin size and the VM migration list as the balls. iFFD has the nice property that it starts with an initial allocation, and then incrementally finds a set of migrations that will help it reach the target utilization for each server. Hence, the packing technique migrates VMs only to the extent required to reach the target utilization for each server.

iFFD was employed to design a power-minimizing placement technique that includes history, and is aptly named as min Power Placement technique with History mPPH. It works identically as mPP in the first phase. For the second phase, it invokes iFFD instead of FFD, thus selecting a placement that takes the earlier placement as a starting point. The mPPH technique tries to minimize migrations by migrating as few VMs as possible, while moving to the new optimal target utilization for the servers. However, even though it is migration aware, it does not compromise on the power minimization aspect of the technique. Hence, if the target utilization for servers changes significantly in a time-window, mPPH still resorts to large scale migrations to minimize power cost.

Consider an exemplary technique PMaP that takes a balanced view of both power and migration cost, and aims to find an allocation that minimizes the sum of the total (power+ migration) cost. pMaP, as seen in FIG. 9, continually finds a new placement for VMs in a fashion that minimizes power, while taking the migration cost into account. The technique is based on the fundamental observation that all the migrations that take us from an old power-minimizing placement to a new power-minimizing placement may not be optimizing the power-migration cost tradeoff. Hence, the technique first invokes any power-minimizing placement technique (mPPH is one preferred choice) and gets a new power-minimizing placement. It then computes the difference between the two placements (the set of migrations that will change the old placement to the new placement) and determines a subset to select. The selection process is based on sorting all the migrations based on their incremental decrease in power per unit migration cost. Note that a set of multiple migrations may be atomic and have to be separately considered en masse as well, while estimating their incremental decrease in power per unit migration cost. Then select the most profitable migration if the power savings due to migration is higher than the migration cost. Repeat the above procedure till no migrations exist that optimize the power-migration cost tradeoff. The following Local Optimality property for PMaP can be proved along the same lines as Theorem 1.

Lemma 1: If pMaP at any given time has a placement P, then the next migration selected by P achieves the highest power-migration cost tradeoff. Hence, every iteration that selects the next migration in pMaP is locally optimal.

pMapper Implementation and Experimental Validation

An exemplary implementation of pMapper and an experimental study to demonstrate its effectiveness are now presented.

Implementation pMapper was implemented to solve the cost minimization problem described in Equation 2. In this formulation, the Arbitrator 118 is driven by performance goals and only arbitrates between the Power Manager 104 and Migration Manager 106 to find a placement that optimizes the power-migration cost tradeoff. The Power Manager implements the power-minimization techniques mPPH and mPP, whereas the Arbitrator implements the pMaP technique to optimize the power migration tradeoff.

The IBM Active Energy Manager (http://www-03.ibm-.com/systems/management/director/extensions/actengrn-rg.html) was used for monitoring power usage and EWLM (IBM Enterprise Work Load Manager, http://www.ibm.com/ developerworks/autonomic/ewlm/) was used as the performance manager 102. In order to use the Active Energy Manager for monitoring, a monitoring agent is co-located with the IBM Director Server and uses network sockets to communicate with the pMapper framework. EWLM uses a metric called Performance Index (PI) to indicate if an application is meeting its required SLA. A PI value of 1 is achieved when the response time of the application equals the target response time as specified in its SLA. Whenever an application fails to meet its PI or outperforms its SLA, EWLM automatically resizes the VM so that the PI value for the application reaches 1. Arbitrator 118 works with a workload manager independent data structure that captures a configuration in terms of VM sizes and their placements. Hence, the Arbitrator uses an adapter that allows it to understand the performance characteristics and partition sizes as reported by EWLM. pMapper was implemented for VMWare ESX-based platforms and hence VMWare Virtual Center was used as the Virtualization Manager. The VI API provided by VMWare ESX 3.0 was sued to communicate with the Virtualization Manager and execute migration actions. In order to execute throttling actions, the IBM Active Energy Manager interface, which directly communicates with the Bladecenter Management Console (BMC) via Intelligent Platform Management Interface (IPMI) commands, was used.

The experimental setup for the performance study will now be described.

Experimental Setup

Figure 11:
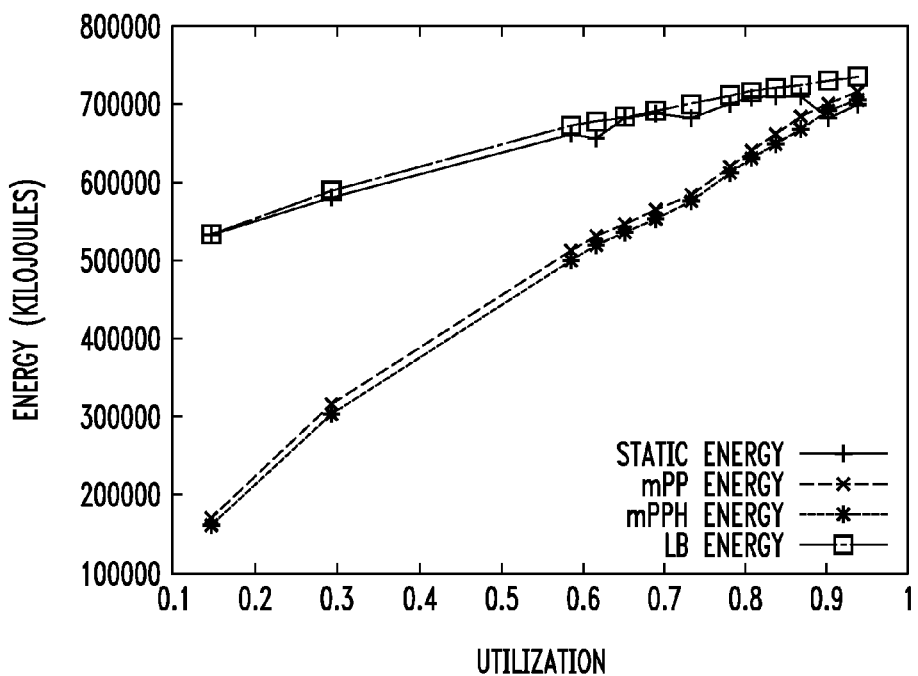

The experimental testbed is driven by server utilization traces obtained from the server farm of a large data center. Conducting experiments on the complete implementation of pMapper would take an inordinately long time (running the experiments for FIG. 11 only would take 4 months as it required 60 different runs). Since the data refresh rate of Active Energy Manager was 5 minutes, it was determined that the exemplary implementation was not focusing on performance (which was handled by EWLM) and the power and migration cost minimization ability of pMapper was studied.

Hence, the performance infrastructure was simulated by replacing the Performance Manager with the application trace data. Further, once the Arbitrator came up with a final placement, the output was fed to a Simulator that estimated the overall cost of the placement. Since the applications had been characterized on the platform earlier, a table-driven simulator was designed that was accurate with 99% confidence. The Simulator simulates the placement of these servers on an HS-21 Bladecenter according to the configuration given by the Arbitrator 118. For comparison, the following techniques were used:

Load Balanced: This placement strategy places the VM in a manner such that the load is balanced across all the blades in the Bladecenter.

Static: This technique takes long term history into account to find the placement that minimizes the power. The technique first estimates the minimum number of servers required to serve all the requests without violating blade server capacities. It then places the VMs (only once) on the servers to minimize power.

mPP: The min Power Placement Technique dynamically determines the placement that minimizes the power for that time window and is based on FFD.

mPPH: The min Power Placement with History Technique determines the power-minimizing placement that takes into account the previous placement.

PMaP: The PMaP Technique optimizes the tradeoff between power cost and migration cost, while computing the new placement for the window.

In the experiments, the Performance Simulator maps each server utilization trace to a Virtual Machine (VM) on the HS-21 with the VM size being set to the CPU utilization on the server. The trace is divided into time windows, and in each time window, the Arbitrator 118 determined a new placement for each of the placement strategies based on the utilization specified by the Performance Manager 102 in the time window. Feed the placements to the Simulator, which estimates the cost of each placement and logs it.

Various methodologies address the power consumed, the migration cost incurred, and the sum of power cost and migration cost. A comparative study of the techniques with change in server utilization was conducted. The number of blades in the Bladecenter was increased to investigate the ability of the techniques to scale and deal with fragmentation. A metric was used to quantify the relative impact of migration cost with power cost and this was termed MP Ratio. The migration cost is determined by estimating the impact of migration on application throughput and consequent revenue loss, computed as per the SLA. This cost is compared with the power cost using the power drawn and the price per kilowatt-hour paid by the enterprise. Pick a reasonable value for this ratio in the baseline setting based on typical SLAs and then vary this ratio to study its impact on the performance of various techniques. Plug in some other power models to investigate if the techniques are dependant on specific power models. Further, by mixing different kinds of physical servers (with different power models), investigate the ability of the techniques to handle heterogeneity. The practicality of the assumptions made was studied.

Non-Limiting Experimental Results

Figure 10:
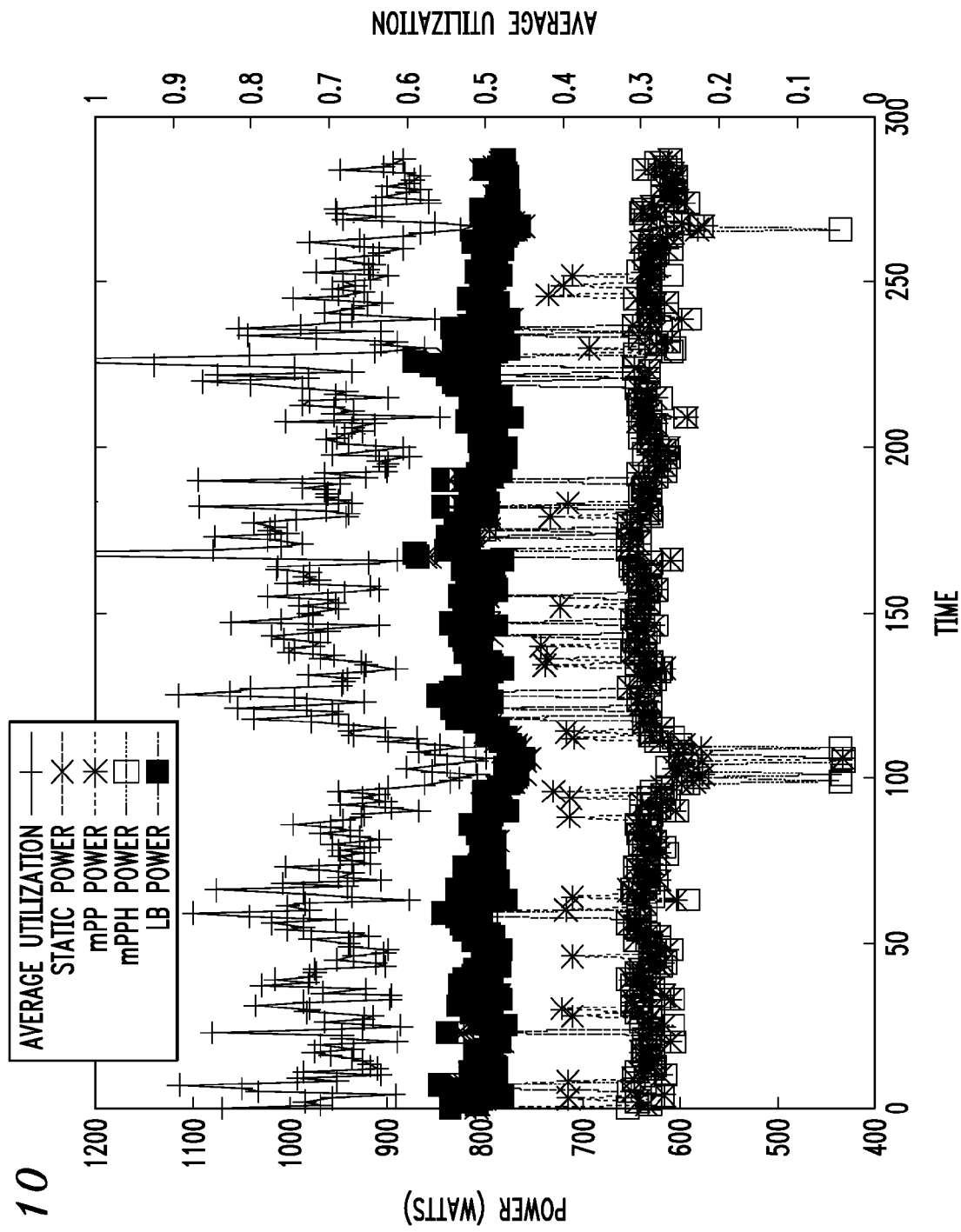
FIGS. 10 and 11 depict exemplary power consumed by various placements strategies with, respectively, time (FIG. 10) and increasing overall utilization (FIG. 1)

Consider the behavior of various techniques as the traces are played with time, as seen in FIG. 10. The aggregate utilization of the VMs varies during the run and the dynamic techniques continually try to adapt to the changed workload. Observe that the dynamic techniques mPP and mPPH are able to save about 200 W of power (25%) from the Load Balanced and Static Placements. However, as the utilization exceeds 0.75, the savings drop significantly. This is because, at high utilization, there is not much scope for consolidation. However, even at high loads, exemplary techniques, according to embodiments of the invention, are able to save some power by taking the decreasing slope of the power curves into account. One or more exemplary techniques try to run most servers at close to their full capacity because the power-curve saturates at high capacity. Hence, instead of balancing the load across all servers, it makes sense to unbalance load even when all the servers are switched on. Observe that the exemplary techniques show very strong correlation with the average utilization. This establishes their ability to continually adapt to workload variations and save power accordingly.

Consider the impact on power at different average utilization values. Towards this purpose, all the traces were compressed (or decompressed) so that the average utilization of the servers could be varied. The trace was compressed to achieve a higher utilization than the baseline, and decompressed to achieve lower utilizations. Observe that the power savings obtained by the proposed power-minimizing techniques is significant at low utilization values. This is because one or more exemplary techniques are able to consolidate the VMs on a few servers only, and save a significant amount of power due to the high static power cost. FIG. 10 reaffirms that in one or more embodiments, most savings come from consolidation and not by unbalancing load. This is evident because the savings of one or more exemplary techniques increase significantly when the average utilization goes below 0.75 and 0.5. These are the utilization values at which an additional server can be switched off. Note that the discontinuities are not so noticeable in FIG. 11. However, since at an average utilization of 0.75, there are many time instances where the utilization goes beyond 0.75 and no server can be switched off, the difference between overall energy consumption between average utilization of 0.7 and 0.75 is not as large as one would expect from FIG. 10.

Figure 12:
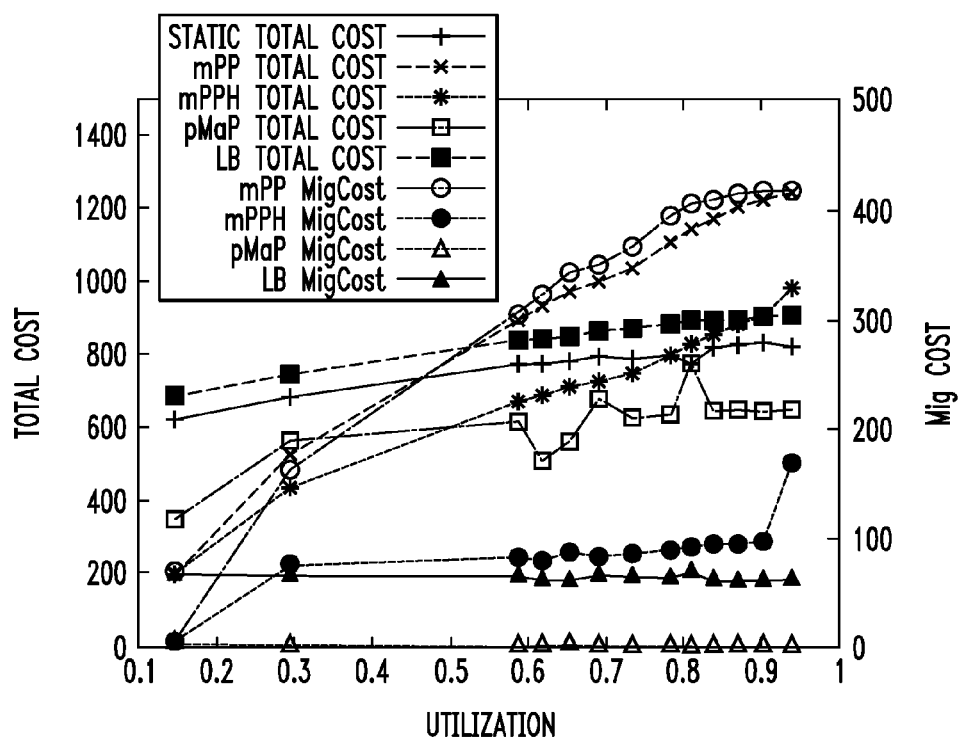
FIGS. 12 and 13 depict exemplary migration cost and overall cost with, respectively, increasing overall utilization (FIG. 12) and change in MP (migration to power cost) ratio (FIG. 13)

The performance of one or more exemplary techniques has been investigated with respect to power consumed by their corresponding placements. Consider now the migration cost and compare the power-minimizing techniques with the migration cost aware pMaP technique as well, as in FIG. 12. Observe that even though the power drawn by pMaP (difference of total cost and migration cost) is higher than mPP or mPPH, the total cost of pMaP is the least amongst all competing techniques. This establishes the importance of taking both the migration and power cost into account, while coming up with a new placement. Also observe that mPP pays a very high migration cost at higher utilization, and underperforms even the LB (Load balanced) and Static placements at very high loads. On the other hand, mPPH incurs very low migration cost (of the same order as load-balanced) and as a result, has a total cost very close to the best performing technique pMaP. This is a direct result of the fact that mPPH takes the previous placement into account while computing a new placement, and tries to minimize the difference between the two placements. Hence, even though mPPH does not compromise on saving power as opposed to pMaP, which can prefer a placement with high power and low migration cost, the migration costs incurred by mPPH are not significant. This establishes mPPH as a good alternative to pMaP, because of its relative simplicity.

Figure 13:
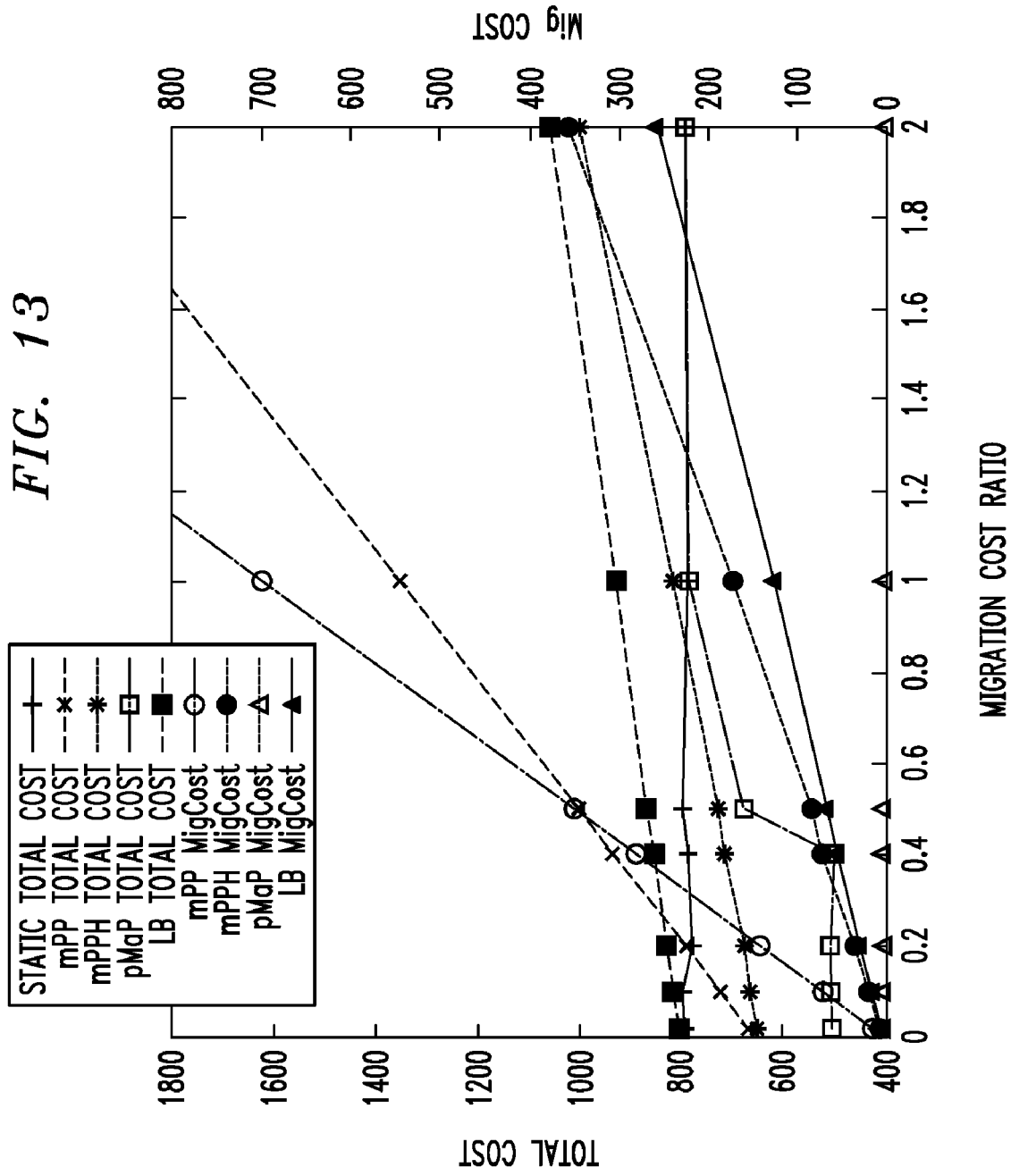

The MP ratio (migration to power cost ratio) varies from one enterprise to another and depends on factors such as energy cost and SLA revenue models. Consider the various exemplary techniques at different MP ratio. Observe in FIG. 13 that MP ratio directly affects the overall performance of mPP. Hence, mPP is the best performing technique (approaching mPPH and pMaP) at low migration costs and underperforms even the power-unaware techniques at very high migration cost. This underscores the importance of taking migration cost into account, along with the power cost for dynamic placement. On the other hand, pMaP takes the increased migration cost factor into account by cutting down migrations. Hence, a high MP ratio does not affect its performance.

The scalability of the techniques was also investigated, along with their ability to deal with fragmentation (large VM sizes). Hence, the number of servers was increased from 4 to

Figure 14:
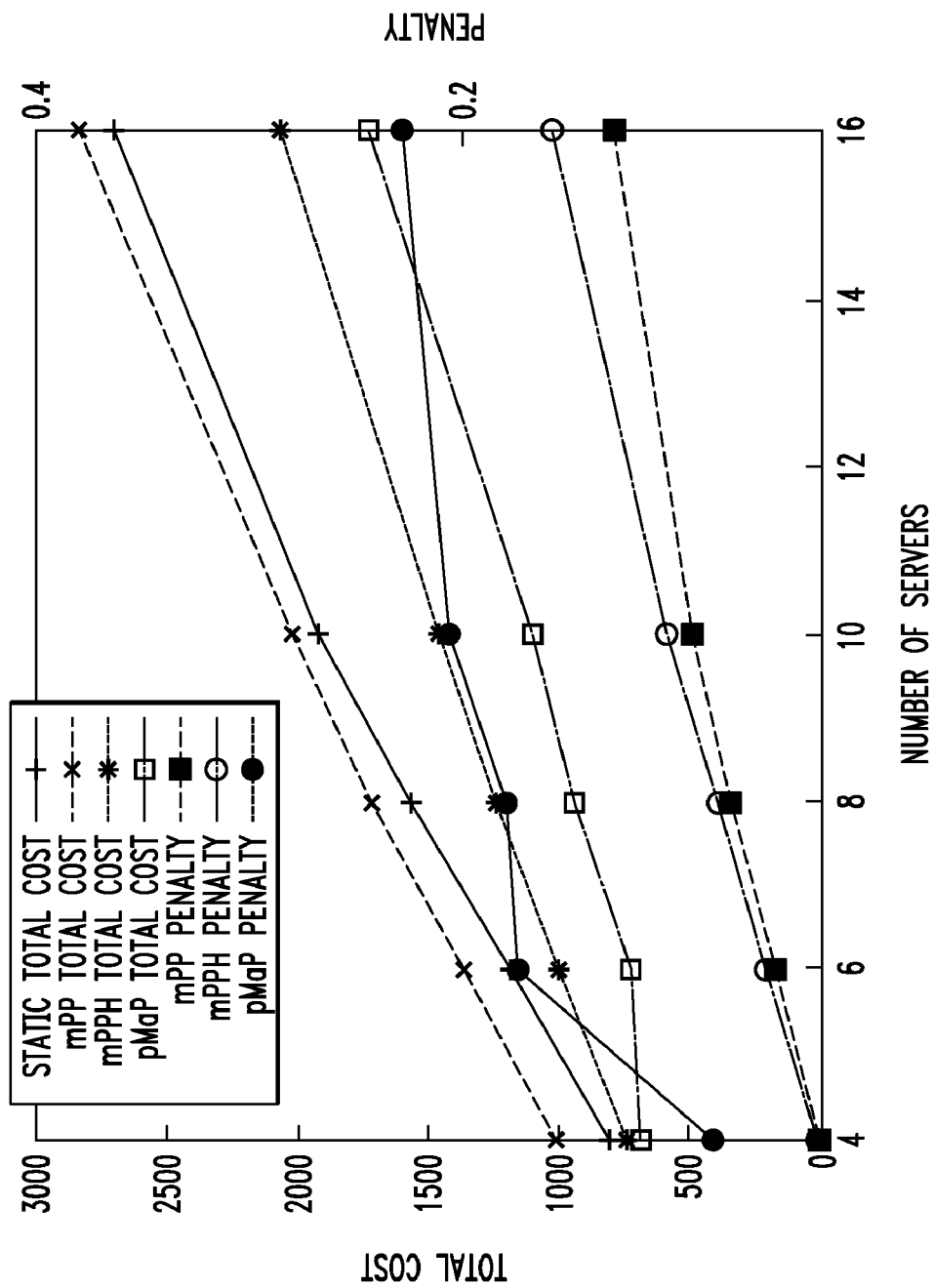
FIG. 14 depicts exemplary overall cost and penalty with increase in servers.
Figure 15:
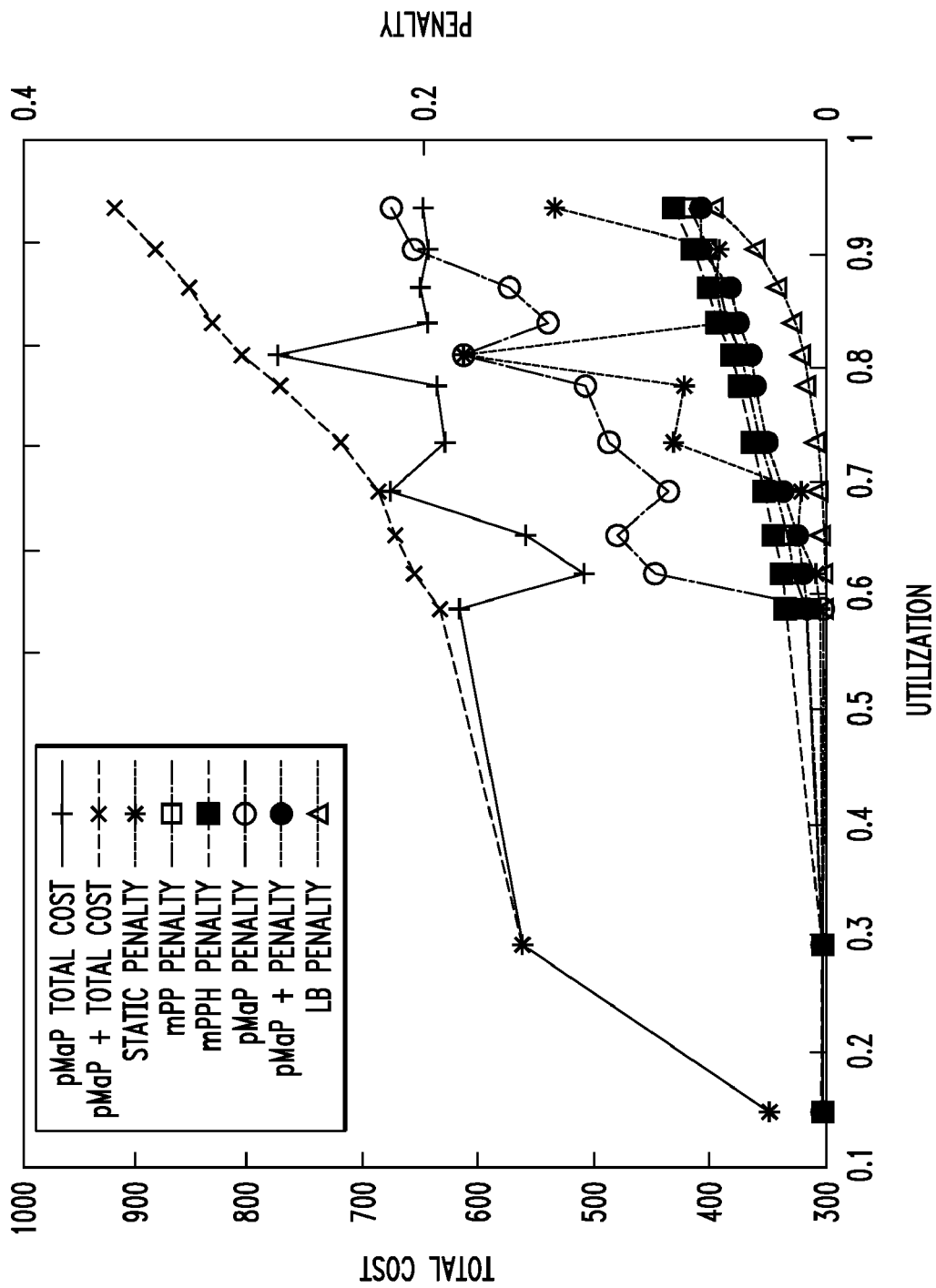
FIG. 15 depicts exemplary power and penalty with increase in fragmentation for penalty aware and unaware techniques.

16. Observe that pMaP and mPPH are the top two performing techniques even with increased number of servers. However, as seen in FIG. 14, while aiming to unbalance load for minimizing power, pMaP was leading to a large number of requests being dropped (or delayed). Call the drop in requests as Penalty of a placement. A reason for this penalty is the huge variance in workload. Hence, at an average load of 0.7 approximately, there are many instances when the transient load goes beyond 1.0 and, as a result, many requests need to be dropped (irrespective of the placement methodology). However, since pMaP is unaware of penalties, it drops more requests than others, while striving to minimize cost. This makes pMaP undesirable for use at high load intensities.

pMaP was engineered to take penalty into account, while exploring the search space between the old placement and the new placement. The modified technique pMaP+, during its exploration, picks only those intermediates whose penalties are below a bound. The bound was fixed to be 0.1 in the experiments. Observe in FIG. 15 that the penalty aware technique pMaP+ now incurs the least penalty amongst mPP, mPPH, pMaP and static. The penalty seen by the Load Balanced technique is the baseline penalty incurred solely because of traffic variations and pMaP+ now has a penalty approaching that of Load Balanced. This engineering allows pMaP+ to again be the technique of choice under all scenarios. Also observe that the penalties of the Static placement also vary a lot, approaching 20% in certain cases. This is, again, a result of the load-shifts that happen with time, re-affirming the importance of a dynamic placement strategy.

Figure 16:
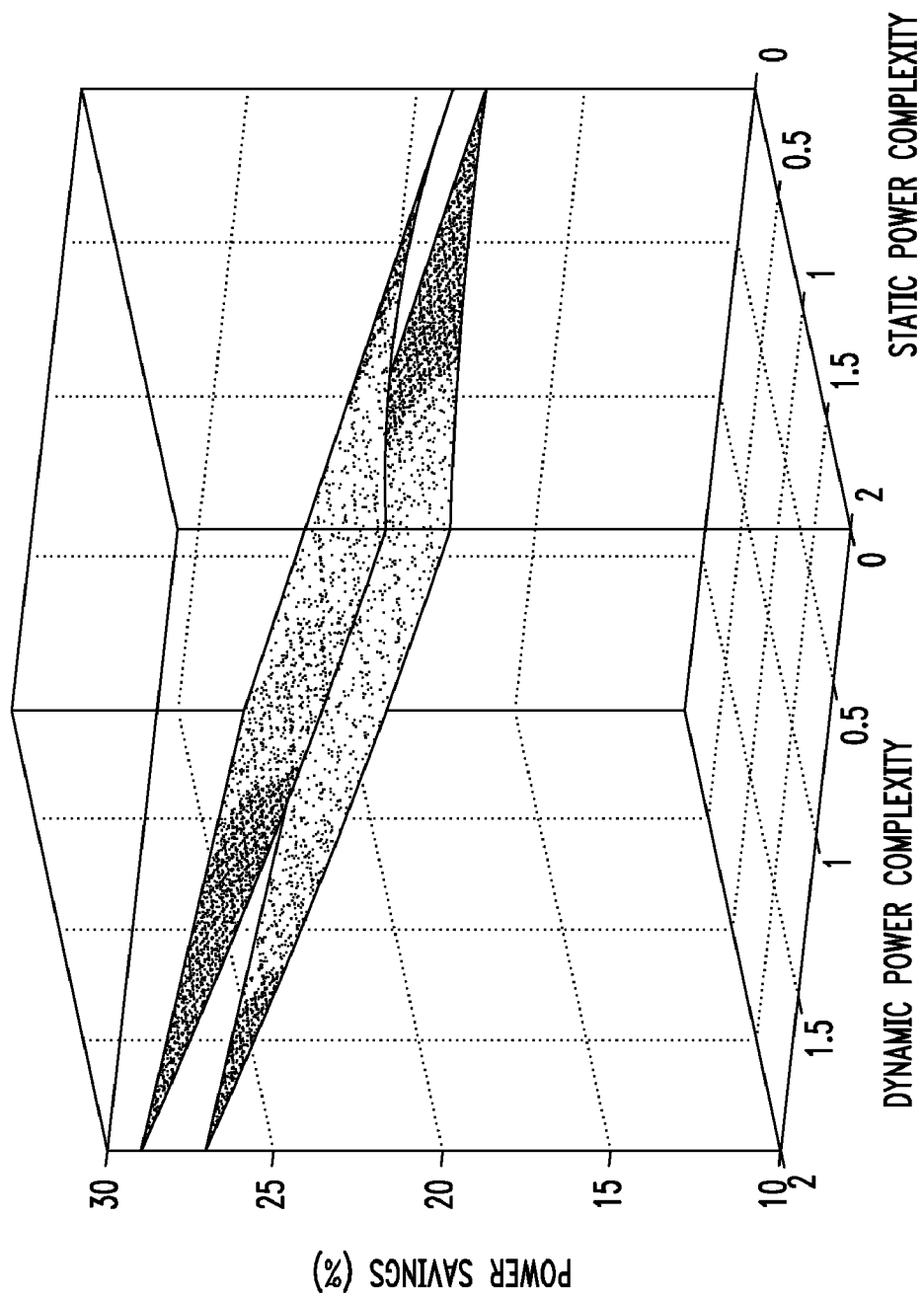
FIG. 16 depicts exemplary power savings of mPP and mPPH in comparison to static placement with increasing heterogeneity.

In this set of experiments, heterogeneity was simulated with various power models. Simulate another server with a power model where the static power or the dynamic power or both may be reduced to half. Increase the number of such servers from 0 to 2 to increase the complexity in Static Power or Dynamic Power, as seen FIG. 16. Observe that increased complexity (due to heterogeneity) leads to higher power savings relative to the Static Placement, which is the best power-unaware placement method. Further, the power savings are almost additive with increase in static or dynamic complexity. Hence, the exemplary techniques are capable of working even better in heterogeneous clusters, thus establishing their efficacy in a wide variety of settings.

Figure 17:
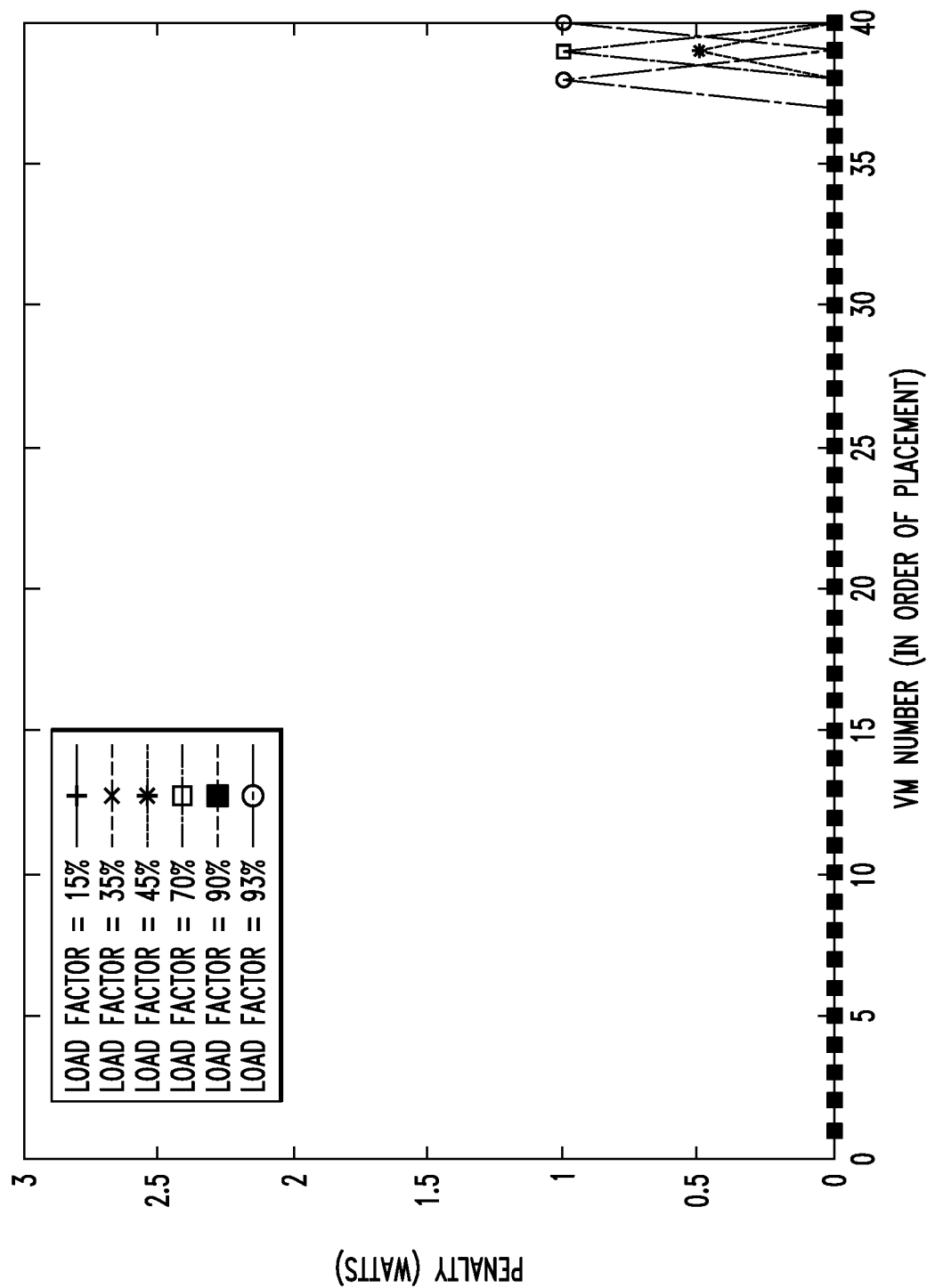
FIG. 17 depicts the exemplary penalty incurred because of the ordering assumption.

One or more exemplary techniques are based on the assumption that for each application being placed, the incremental power drawn by it at various workloads can be characterized on all the server platforms. Then use this incremental power table to decide which server to place the application on, during dynamic application placement. Consider the practicality of this assumption, by looking at a random sample of 100 points from this selection trace log and measuring the incremental power drawn due to selection and the incremental power drawn by selecting any other server. FIG. 17 shows the accuracy of the estimate in terms of the penalty accrued due to wrong selection for each placed application. If the right selection was made, get a penalty of zero, whereas if there was another server with less incremental power, incur a penalty equal to the difference. Observe that the Ordering property holds for most of the applications with a few errors resulting in an error of 1 watt or less. As compared to the total power consumption of about 750 W, this error is insignificant. Further, observe that the property does not hold only for the last few applications being placed. Hence, any errors made do not get cascaded to other applications, as most of them were already placed. This is a direct result of the fact that FFD was adopted, which leads to unbalanced load. Hence, for most of the comparisons that used the Ordering property, an idle server was compared with a loaded server, and very clearly the loaded server was selected because of the huge static power cost. Hence, a local search based on the Ordering property worked close to optimal. Further, a closer look at the plots reveals that the penalty is paid only when the overall load approaches 50% or 75%. This is because in these cases all the servers that were loaded were close to their capacity. Hence, it was necessary to select between servers that were all loaded. In such a scenario, the Ordering property did not seem to hold in a few instances (about 1 in 5). However, this scenario encompasses only a very small portion of the overall problem space. Hence, conclude that pMapper is able to make use of the Ordering property to quickly come up with placements that are very close to optimal (less than 0.2% penalty).

Aspects of the invention work in a virtualized setting with migration costs and can deal with heterogeneous clusters for placement. Furthermore, aspects of the invention explicitly consider migration costs of containers and/or deal with the complexity of application specific power models in a heterogeneous server cluster. One or more embodiments perform power-aware placements on heterogeneous servers.

One or more embodiments of the invention provide an application placement controller pMapper that minimizes power and migration costs, while meeting the performance guarantees. pMapper addresses the problem of power and migration cost aware application placement in heterogeneous server clusters that support virtualization with live VM migration. The viability of using CPU utilization based application specific power models to develop placement techniques was investigated and the assumptions were validated through test-bed experimentation. Through a carefully designed experimental methodology on two server platforms, it was concluded that a power minimization framework is feasible. Insights from the study pin down the conditions under which this problem can be solved. Three dynamic placement techniques are provided to minimize power and migration cost and it has been experimentally demonstrated that there are various scenarios in which each technique is effective. The superiority of the most refined technique pMaP+ has been established under most settings over other power-unaware techniques as well as power aware techniques, both theoretically and experimentally.

Figure 18:
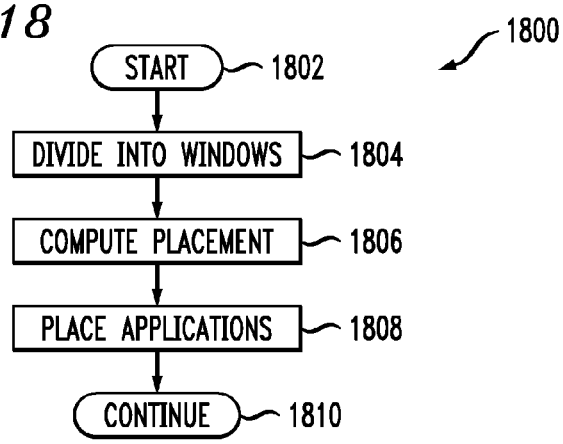
FIGS. 18-21 present flow charts of exemplary method steps, according to several further aspects of the invention.

Reference should now be had to FIG. 18. Given the description thus far, it will be appreciated that, in general terms, one or more embodiments of the invention provide a method 1800 for placing N applications on M virtualized servers having power management capability. After beginning at block 1802, the method includes the step 1804 of dividing a time horizon into a plurality of time windows. In step 1806, for each given one of the windows, compute a placement of the N applications. Preferably, power cost, migration cost, and performance benefit are all taken into account. The migration cost refers to cost to migrate from a first virtualized server to a second virtualized server for the given one of the windows. Step 1808 includes placing the N applications onto the M virtualized servers, for each of the plurality of time windows, in accordance with the placement computed in the computing step 1806 for each of the windows. Processing continues at block 1810.

In one or more embodiments, computing step 1806 takes into account the power cost, the migration cost, and the performance benefit, by maximizing net benefit in accordance with equation (1).

Figure 19:
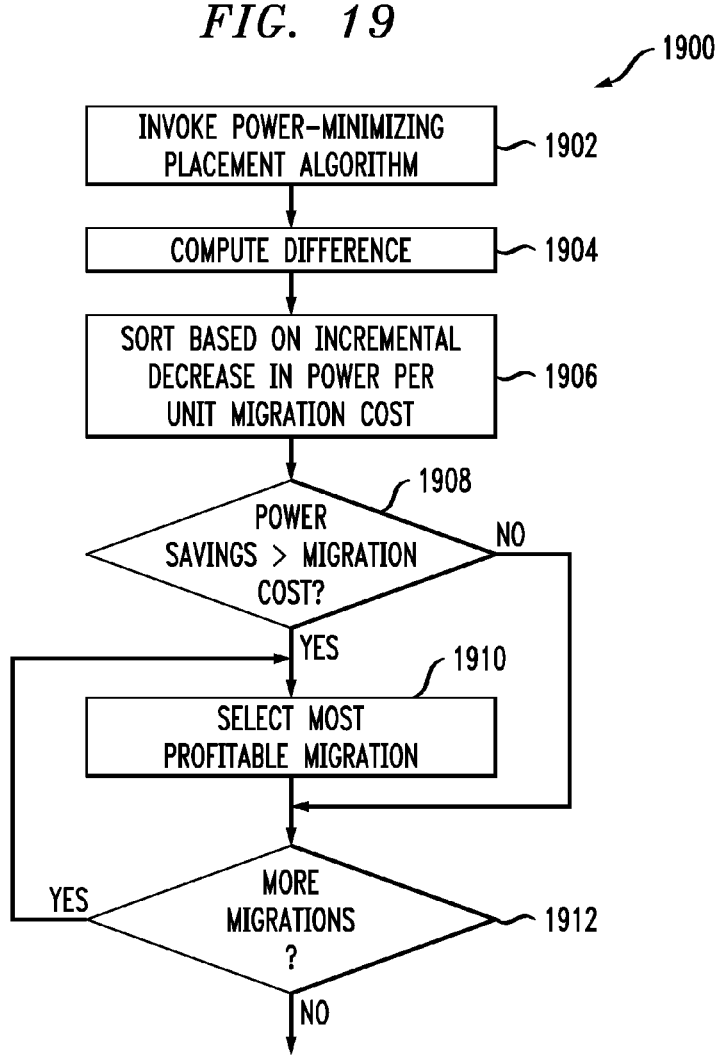

In another aspect, computing step 1806 takes into account the power cost and the migration cost, by minimizing overall cost in accordance with equation (2). With reference to FIG. 19, which presents a flow chart 1900 showing one possible way to carry out such minimizing, step 1902 includes invoking a power-minimizing placement technique to obtain a new power-minimizing placement, while step 1904 includes computing a difference between an initial placement and the new power-minimizing placement, as a set of migrations that will change the initial placement to the new power-minimizing placement. Furthermore, an additional step includes obtaining a selected subset of the migrations.

The step of obtaining the selected subset can include, for example, sorting all of the set of migrations based on incremental decrease in power per unit migration cost, as at step 1906, and, as indicated at decision block 1908 and block 1910, selecting a most profitable migration, if power savings due to migration is higher than migration cost. As shown in block 1912, an additional step in obtaining the selected subset can include continuing the selecting of the most profitable migration, until no migrations exist which optimize power-migration cost tradeoff.

In one or more instances, the computing step 1806 takes into account the migration cost and the performance benefit, by maximizing net benefit in accordance with equation (3).

Figure 20:
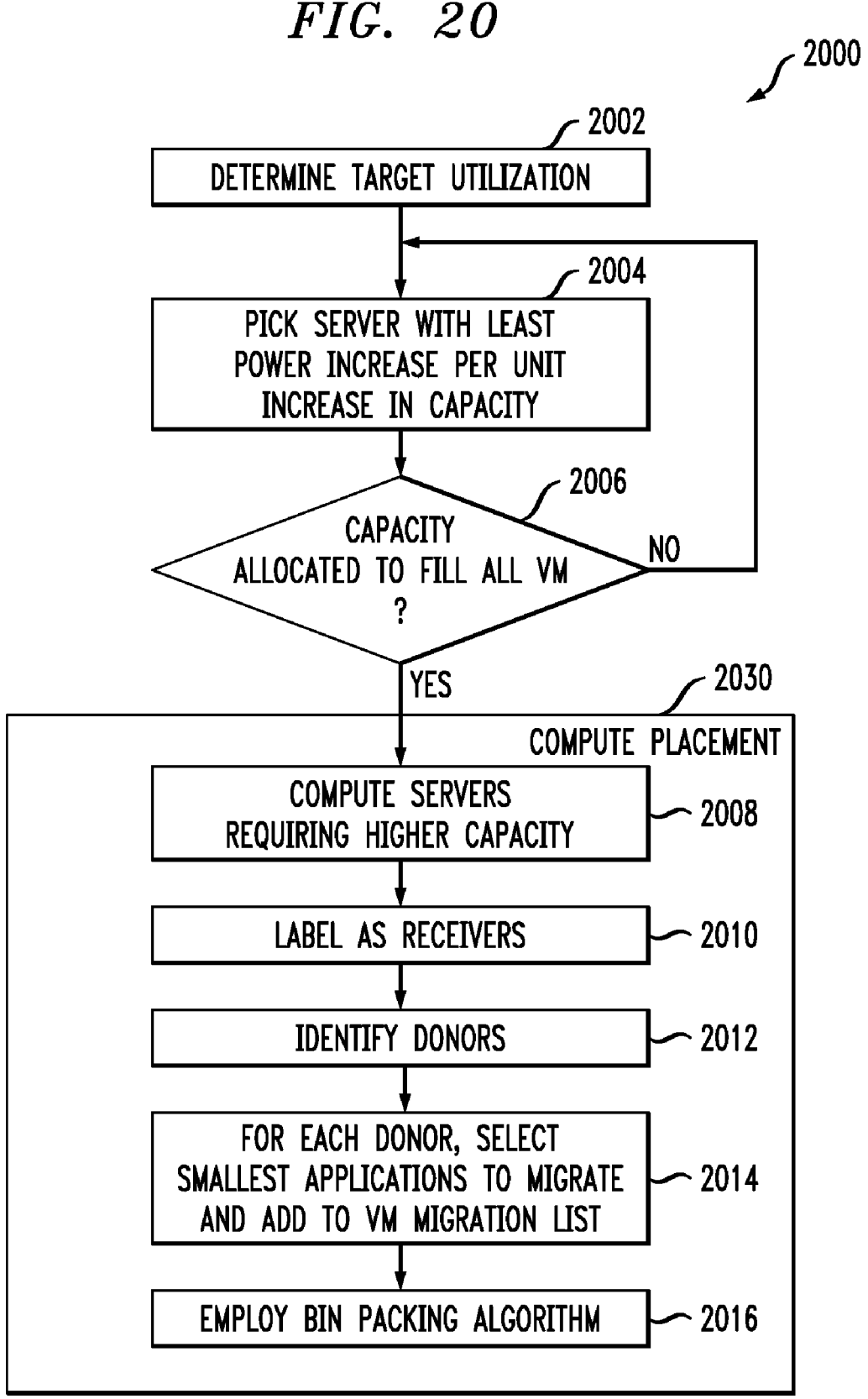

Reference should now be had to FIG. 20. In one or more embodiments, there are a plurality of virtual machines, and the computing step 1806 includes, for each of the windows, the following steps. Step 2002 includes determining a target utilization for each of the servers based on a power model for each given one of the servers. Steps 2004 and 2006 includes picking a given one of the servers with the least power increase per unit increase in capacity, until capacity has been allocated to fit all the virtual machines. Step 2030 includes employing an incremental first fit decreasing bin packing technique to compute placement of the applications on the virtualized servers.

In a non-limiting example, the incremental first fit decreasing bin packing technique includes steps 2008-2016. Step 2008 includes computing a list of certain ones of the servers which require higher capacity in a new allocation, while step 2010 includes labeling those certain ones of the servers as receivers, and step 2012 includes identifying as donors those of the servers with a target capacity lower than a current capacity. As per step 2014, for each of the donors, select smallest ones of the applications to migrate and add the smallest ones of the applications to a virtual machine migration list. Step 2016 includes employing a first fit decreasing bin packing technique with spare capacity on the receivers as bin size and the virtual machine migration list as balls, wherein the spare capacity comprises target capacity less current capacity. Note that target capacity and current capacity are the same as target utilization and current utilization. However, capacity is a preferred term because capacity can be used in a normalized sense across the servers. For example, it can be that VM1 requires 200 units of compute capacity and VM2 requires 300 units. On the other hand, utilization is always relative to a server. In the above context, both are the same.

Figure 21:
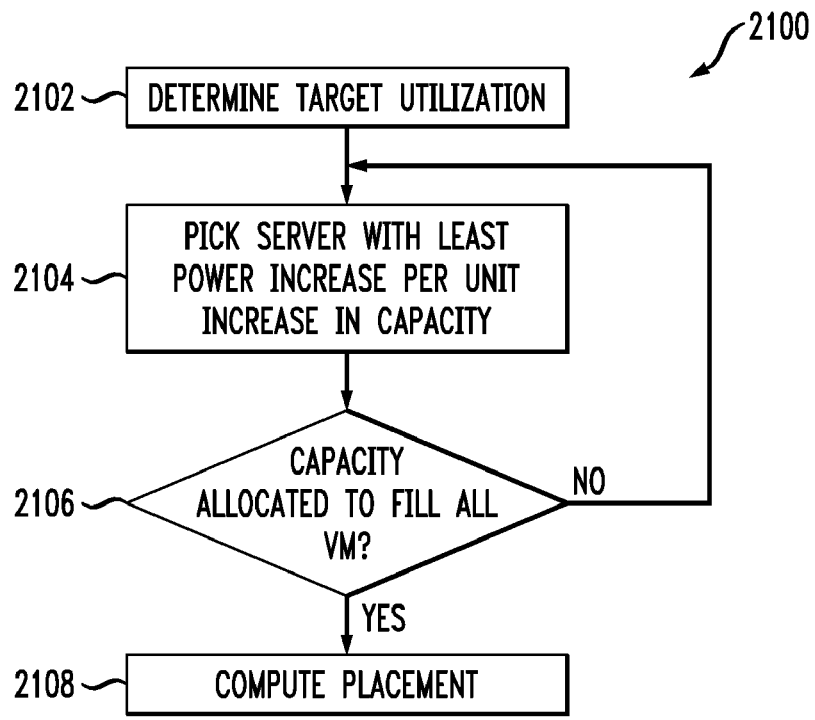

Referring back again to FIG. 18, in another aspect, an alternative method for placing N applications on M virtualized servers having power management capability will now be discussed. Again, after beginning at block 1802, the method includes dividing a time horizon into a plurality of time windows, as at block 1804, and for each given one of the windows, computing a placement of the N applications, as at block 1806. In the alternative method, power cost and performance benefit, but not necessarily migration cost, are taken into account. Furthermore, in the alternative method, step 1808 includes placing the N applications onto the M virtualized servers, for each of the plurality of time windows, in accordance with the placement computed in the computing step 1806 for each of the windows; there are a plurality of virtual machines; and the computing step 1806 includes, for each of the windows, steps depicted in flow chart 2100 of FIG. 21. In particular, step 2102 includes determining a target utilization for each of the servers based on a power model for each given one of the servers, and steps 2104 and 2106 include picking a given one of the servers with the least power increase per unit increase in capacity, until capacity has been allocated to fit all the virtual machines. Step 2108 includes employing a first fit decreasing bin packing technique to compute placement of the applications on the virtualized servers.

The examples presented herein assume each application is hosted on a separate virtual machine. Hence, one can use the word "application" and "VM" interchangeably. A VM can be thought of as an isolated container on a physical server, which supports virtualization. Hence, a physical server that can support virtualization can be called a virtualized server, that is, as used herein, a physical server is the same thing as a virtualized physical server. Embodiments of the invention place virtual machines on physical machines. Hence, it can also be the that aspects of the invention place applications on virtualized servers.

Exemplary System and Article of Manufacture Details

A variety of techniques, utilizing dedicated hardware, general purpose processors, firmware, software, or a combination of the foregoing may be employed to implement the present invention or components thereof. One or more embodiments of the invention, or elements thereof, can be implemented in the form of a computer product including a computer usable medium with computer usable program code for performing the method steps indicated. Furthermore, one or more embodiments of the invention, or elements thereof, can be implemented in the form of an apparatus including a memory and at least one processor that is coupled to the memory and operative to perform exemplary method steps.

Figure 22:
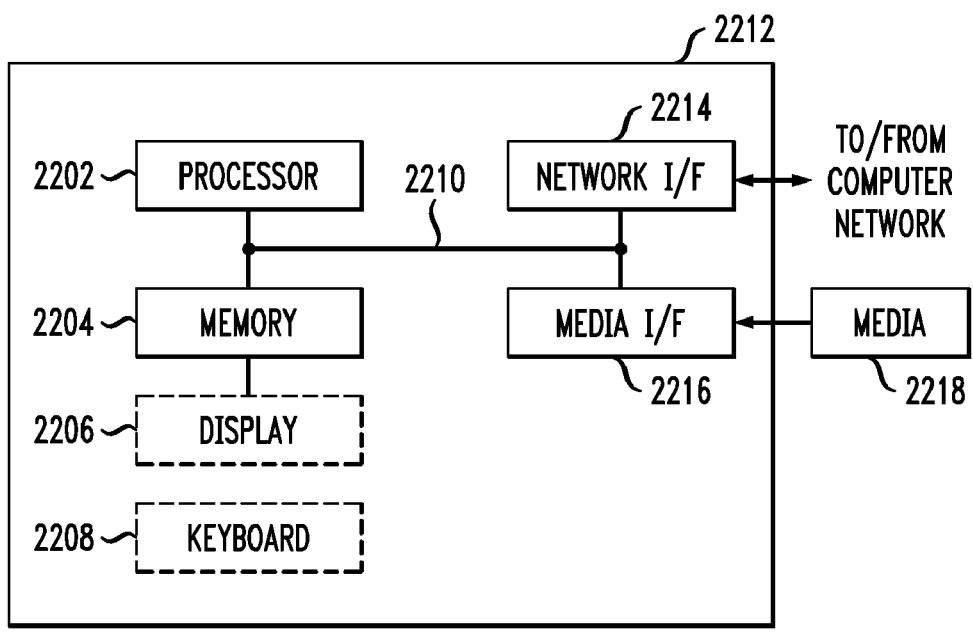
FIG. 22 depicts a computer system that may be useful in implementing one or more aspects and/or elements of the present invention.

One or more embodiments can make use of software running on a general purpose computer or workstation. With reference to FIG. 22, such an implementation might employ, for example, a processor 2202, a memory 2204, and an input/output interface formed, for example, by a display 2206 and a keyboard 2208. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 2202, memory 2204, and input/output interface such as display 2206 and keyboard 2208 can be interconnected, for example, via bus 2210 as part of a data processing unit 2212. Suitable interconnections, for example via bus 2210, can also be provided to a network interface 2214, such as a network card, which can be provided to interface with a computer network, and to a media interface 2216, such as a diskette or CD-ROM drive, which can be provided to interface with media 2218.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and executed by a CPU. Such software could include, but is not limited to, firmware, resident software, microcode, and the like.

Furthermore, the invention can take the form of a computer program product accessible from a computer-usable or computer-readable medium (for example, media 2218) providing program code for use by or in connection with a computer or any instruction execution system. For the purposes of this description, a computer usable or computer readable medium can be any apparatus for use by or in connection with the instruction execution system, apparatus, or device. The medium can store program code to execute one or more method steps set forth herein.

The medium can be an electronic, magnetic, optical, electromagnetic, infrared, or semiconductor system (or apparatus or device) or a propagation medium. Examples of a tangible computer-readable medium include a semiconductor or solid-state memory (for example memory 2204), magnetic tape, a removable computer diskette (for example media 2218), a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor 2202 coupled directly or indirectly to memory elements 2204 through a system bus 2210. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards 2208, displays 2206, pointing devices, and the like) can be coupled to the system either directly (such as via bus 2210) or through intervening I/O controllers (omitted for clarity).

Network adapters such as network interface 2214 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 2212 as shown in FIG. 22) running a server program. It will be understood that such a physical server may or may not include a display and keyboard.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). The pMapper software described herein can run, for example, on either one of the servers in the farm or on another "admin" computer. However, in typical cases, it will run on a separate computer outside the farm it manages.

Embodiments of the invention have been described herein with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a tangible computer-readable storage medium that can direct a computer or other programmable data processing apparatus to function in a particular manner, such that the instructions stored in the computer-readable medium produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

It will be appreciated and should be understood that the exemplary embodiments of the invention described above can be implemented in a number of different fashions. Given the teachings of the invention provided herein, one of ordinary skill in the related art will be able to contemplate other implementations of the invention. Indeed, although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for placing N applications on M virtualized servers, said servers having power management capability, said method comprising the steps of:
    dividing a time horizon into a plurality of time windows;
    for each given one of said windows, computing a placement of said N applications, taking into account power cost, migration cost, and performance benefit, wherein said migration cost refers to cost to migrate from a first virtualized server to a second virtualized server for said given one of said windows; and
    placing said N applications onto said M virtualized servers, for each of said plurality of time windows, in accordance with said placement computed in said computing step for each of said windows.

2. A computer program product comprising a tangible computer useable storage medium including computer usable program code for placing N applications on M virtualized servers, said servers having power management capability, said computer program product including:
    dividing a time horizon into a plurality of time windows;
    for each given one of said windows, computing a placement of said N applications, taking into account power cost and performance benefit; and
    placing said N applications onto said M virtualized servers, for each of said plurality of time windows, in accordance with said placement computed in said computing step for each of said windows;
    wherein there are a plurality of virtual machines, and wherein said computing step comprises, for each of said windows:
        determining a target utilization for each of said servers based on a power model for each given one of said servers;
        picking a given one of said servers with a least power increase per unit increase in capacity, until capacity has been allocated to fit all said virtual machines; and
        employing a first fit decreasing bin packing technique to compute placement of said applications on said virtualized servers.

3. A computer program product comprising a tangible computer useable storage medium including computer usable program code for placing N applications on M virtualized servers, said servers having power management capability, said computer program product including:
    computer usable program code for dividing a time horizon into a plurality of time windows;
    computer usable program code for, for each given one of said windows, computing a placement of said N applications, taking into account power cost, migration cost, and performance benefit, wherein said migration cost refers to cost to migrate from a first virtualized server to a second virtualized server for said given one of said windows; and
    computer usable program code for placing said N applications onto said M virtualized servers, for each of said plurality of time windows, in accordance with said placement computed in said computing step for each of said windows.

4. A system for placing N applications on M virtualized servers, said servers having power management capability, said system comprising:
    a memory; and
    at least one processor, coupled to said memory, and operative to:
        divide a time horizon into a plurality of time windows;
        for each given one of said windows, compute a placement of said N applications, taking into account power cost, migration cost, and performance benefit, wherein said migration cost refers to cost to migrate from a first virtualized server to a second virtualized server for said given one of said windows; and
        place said N applications onto said M virtualized servers, for each of said plurality of time windows, in accordance with said placement computed in said computing step for each of said windows.

* * * * *

UNITED STATES PATENT AND TRADEMARK OFFICE
CERTIFICATE OF CORRECTION

| | | |
|---|---|---|
| PATENT NO. | : 8,214,829 B2 | Page 1 of 4 |
| APPLICATION NO. | : 12/354072 | |
| DATED | : July 3, 2012 | |
| INVENTOR(S) | : Anindya Neogi et al. | |

It is certified that error appears in the above-identified patent and that said Letters Patent is hereby corrected as shown below:

In the Claims

Column 21, line 12 - column 22, line 42 replace claims 1-4 with the following:

1. A method for placing N applications on M virtualized servers, said servers having power management capability, said method comprising the steps of:

dividing a time horizon into a plurality of time windows;

for each given one of said windows, computing a placement of said N applications, taking into account power cost, migration cost, and performance benefit, wherein said migration cost refers to cost to migrate from a first virtualized server to a second virtualized server for said given one of said windows, and wherein said computing step takes into account said power cost, said migration cost, and said performance benefit, by maximizing net benefit in accordance with:

$$maximize \sum_{i=1}^{N} \sum_{j=1}^{M} B(x_{i,j}) - \sum_{j=1}^{M} P(A_I) - Mig(A_o, A_I)$$

where:

$A_o$ comprises an old allocation of said applications to said servers;

B(A) comprises a performance benefit function modeling said performance benefit;

P(A) comprises a power cost function modeling said power cost;

Mig comprises a migration cost function, modeling said migration cost, for any allocation A; and Signed and Sealed this
Twenty-fourth Day of May, 2016

Michelle K. Lee
*Director of the United States Patent and Trademark Office*

$A_I$ comprises an allocation defined by variables $x_{i,j}$, where $x_{i,j}$ denotes resource allocated to application $V_i$ on server $S_j$; and placing said N applications onto said M virtualized servers, for each of said plurality of time windows, in accordance with said placement computed in said computing step for each of said windows.

2. A computer program product comprising a non-transitory computer useable storage medium including computer usable program code for placing N applications on M virtualized servers, said servers having power management capability, said computer program product including:

dividing a time horizon into a plurality of time windows;

for each given one of said windows, computing a placement of said N applications, taking into account power cost and performance benefit, and wherein said computing step takes into account said power cost, said migration cost, and said performance benefit, by maximizing net benefit in accordance with:

$$maximize \sum_{i=1}^{N} \sum_{j=1}^{M} B(x_{i,j}) - \sum_{j=1}^{M} P(A_I) - Mig(A_o, A_I)$$

where:

$A_o$ comprises an old allocation of said applications to said servers;

B(A) comprises a performance benefit function modeling said performance benefit;

P(A) comprises a power cost function modeling said power cost;

Mig comprises a migration cost function, modeling said migration cost, for any allocation A; and $A_I$ comprises an allocation defined by variables $x_{i,j}$, where $x_{i,j}$ denotes resource allocated to application $V_i$ on server $S_j$; and placing said N applications onto said M virtualized servers, for each of said plurality of time windows, in accordance with said placement computed in said computing step for each of said windows;

wherein there are a plurality of virtual machines, and wherein said computing step comprises, for each of said windows:

determining a target utilization for each of said servers based on a power model for each given one of said servers;

picking a given one of said servers with a least power increase per unit increase in capacity, until capacity has been allocated to fit all said virtual machines; and employing a first fit decreasing bin packing technique to compute placement of said applications on said virtualized servers.

3. A computer program product comprising a non-transitory computer useable storage medium including computer usable program code for placing N applications on M virtualized servers, said servers having power management capability, said computer program product including:

computer usable program code for dividing a time horizon into a plurality of time windows;

computer usable program code for, for each given one of said windows, computing a placement of said N applications, taking into account power cost, migration cost, and performance benefit, wherein said migration cost refers to cost to migrate from a first virtualized server to a second virtualized server for said given one of said windows, and wherein said computing step takes into account said power cost, said migration cost, and said performance benefit, by maximizing net benefit in accordance with:

$$maximize \sum_{i=1}^{N} \sum_{j=1}^{M} B(x_{i,j}) - \sum_{j=1}^{M} P(A_I) - Mig(A_o, A_I)$$

where:

$A_o$ comprises an old allocation of said applications to said servers;

B(A) comprises a performance benefit function modeling said performance benefit;

P(A) comprises a power cost function modeling said power cost;

Mig comprises a migration cost function, modeling said migration cost, for any allocation A; and $A_I$ comprises an allocation defined by variables $x_{i,j}$, where $x_{i,j}$ denotes resource allocated to application $V_i$ on server $S_j$; and computer usable program code for placing said N applications onto said M virtualized servers, for each of said plurality of time windows, in accordance with said placement computed in said computing step for each of said windows.

4. A system for placing N applications on M virtualized servers, said servers having power management capability, said system comprising:

a memory; and at least one processor, coupled to said memory, and operative to:

divide a time horizon into a plurality of time windows;

for each given one of said windows, compute a placement of said N applications, taking into account power cost, migration cost, and performance benefit, wherein said migration cost refers to cost to migrate from a first virtualized server to a second virtualized server for said given one of said windows, and wherein said computing step takes into account said power cost, said migration cost, and said performance benefit, by maximizing net benefit in accordance with:

$$maximize \sum_{i=1}^{N} \sum_{j=1}^{M} B(x_{i,j}) - \sum_{j=1}^{M} P(A_I) - Mig(A_o, A_I)$$

where:

$A_o$ comprises an old allocation of said applications to said servers;

$B(A)$ comprises a performance benefit function modeling said performance benefit;

$P(A)$ comprises a power cost function modeling said power cost;

Mig comprises a migration cost function, modeling said migration cost, for any allocation A; and $A_I$ comprises an allocation defined by variables $x_{i,j}$, where $x_{i,j}$ denotes resource allocated to application $V_i$ on server $S_j$; and place said N applications onto said M virtualized servers, for each of said plurality of time windows, in accordance with said placement computed in said computing step for each of said windows.